(12) United States Patent
Favaretto

(10) Patent No.: US 12,491,762 B2
(45) Date of Patent: Dec. 9, 2025

(54) CAR PROVIDED WITH AN INTERNAL COMBUSTION ENGINE HAVING A SIDE EXHAUST

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 285 days.

(21) Appl. No.: 18/454,878

(22) Filed: Aug. 24, 2023

(65) Prior Publication Data

US 2024/0100938 A1    Mar. 28, 2024

(30) Foreign Application Priority Data

Aug. 25, 2022 (IT) .................. 102022000017568

(51) Int. Cl.
    *B60K 13/04*          (2006.01)
    *F01N 13/08*          (2010.01)
    *F01N 13/18*          (2010.01)
    *F01N 13/00*          (2010.01)

(52) U.S. Cl.
    CPC ........... *B60K 13/04* (2013.01); *F01N 13/082* (2013.01); *F01N 13/1805* (2013.01); *F01N 13/011* (2014.06); *F01N 2340/04* (2013.01)

(58) Field of Classification Search
CPC ........ B60K 13/04; F01N 13/00; F01N 13/08; F01N 13/082; F01N 13/011; F01N 13/1805

See application file for complete search history.

(56) References Cited

U.S. PATENT DOCUMENTS

| | | | |
|---|---|---|---|
| 2008/0251306 A1* | 10/2008 | Kobayashi | B62D 25/2045 180/89.2 |
| 2020/0353808 A1* | 11/2020 | Favaretto | B60W 10/06 |
| 2022/0025793 A1 | 1/2022 | Mccord | |

FOREIGN PATENT DOCUMENTS

DE        10042012 A1    5/2001

OTHER PUBLICATIONS

Italian Search Report for Application No. 102022000017568, Filing Date: Aug. 25, 2022; Date of Mailing: Feb. 16, 2023, 11 pages.

(Continued)

*Primary Examiner* — Timothy Hannon
(74) *Attorney, Agent, or Firm* — CANTOR COLBURN LLP

(57) ABSTRACT

A car having: two front wheels; two rear drive wheels; a passenger compartment which is arranged between the two front wheels and the two rear wheels; a body delimiting the passenger compartment and having two sidewalls wherein at least two doors are obtained; a bottom forming the lowest part of the car and in use facing a road surface on which the car moves; an internal combustion engine which is provided with a plurality of cylinders within which respective pistons slide and with a drive shaft connected to the pistons; and at least one exhaust duct which originates from the cylinders and ends in a silencer provided with at least one outlet opening. The outlet opening of the silencer is arranged in an asymmetrical manner on only one side of the car and is located between a rear wheel and a door.

12 Claims, 28 Drawing Sheets

(56) References Cited

OTHER PUBLICATIONS

Porsche AG: "Porsche 962 C bis ins letzte Detail in seinen Ursprungszustand versetzt", Oct. 24, 2021 (Oct. 24, 2021), XP002808602, Retrieved from the Internet: URL:https://newsroom.porsche.com/de/2021/historie/porsche-hans-joachim-stuck-962c-rennwagen-wiedersehen-35-jahre-25998.html [retrieved on Feb. 9, 2023].
TheSketchMonkey: "Mid-Engined Dodge Viper? Why it should Never exist", You Tube Aug. 8, 2020 (Aug. 8, 2020), XP093024773, Retrieved from the Internet: URL:https://www.youtube.com/watch?v=DiaJiX_I4tm4 [retrieved on Feb. 9, 2023].
Ultimatecarpage.com: "Aston Martin DB3S", Aug. 30, 2020 (Aug. 30, 2020), XP002808601, Retrieved from the Internet: URL:https://www.ultimatecarpage.com/cg/848/Aston-Martin-DB3S.html[retrieved on Feb. 9, 2023].

\* cited by examiner

CAR PROVIDED WITH AN INTERNAL COMBUSTION ENGINE HAVING A SIDE EXHAUST

CROSS-REFERENCE TO RELATED PATENT APPLICATIONS

This patent application claims priority from Italian patent application no. 102022000017568 filed on Aug. 25, 2022, the entire disclosure of which is incorporated herein by reference.

FIELD OF THE ART

The present invention relates to a car provided with an internal combustion engine.

The present invention is advantageously applied to a car provided with an internal combustion engine arranged in a central/rear position (i.e., behind the passenger compartment), to which the following discussion will make explicit reference without thereby losing generality.

PRIOR ART

In all cars currently in production and provided with an internal combustion engine arranged in a central/rear position, the exhaust system comprises (at least) a silencer which is arranged in a rear position and has (at least) an outlet opening which is configured to release the exhaust gases into the atmosphere and is located at the rear area of the car.

In a high-performance sports car, the noise of the internal combustion engine which is perceived inside the passenger compartment is important. That is to say, an important component in the assessment of a high-performance sports car is the "quality" of the sound emitted at the exhaust (not only and not so much in terms of sound intensity, but above all in terms of the "pleasantness" of the sound), i.e., the degree of satisfaction in using a high-performance sports car is also significantly influenced by the "quality" of the sound emitted at the exhaust.

In order to actively control the sound emitted at the exhaust, several high-performance sports cars have a variable-geometry exhaust system, i.e., an exhaust system provided with one or more electrically or pneumatically piloted valves which allow the path of the exhaust gases (and thus the sound) along the exhaust system to be modified; as a result, in use, the electronic control unit of the engine modifies the geometry of the exhaust system in real time to try to always offer a sound emitted at the exhaust which corresponds to the expectations of the car's users and, of course, is compatible with reaching the homologation targets on the intensity of the exhaust noise level.

In general, turbocharged engines are penalised because the presence of the turbine along the exhaust duct and the compressor along the intake duct add a filter and lower the sound levels of both the exhaust and the intake.

Furthermore, the latest EURO6C homologation regulations on pollutant emissions impose the use of exhaust gas treatment devices which significantly penalise sound performance, as a particulate filter (called GPF, acronym of "Gasoline Particulate Filter") is required in series with the catalytic converter, even in the case of petrol engines.

In order to improve the perception of internal combustion engine noise inside the passenger compartment, devices have been proposed to amplify the intake noise, for example as described in U.S. Pat. No. 7,975,802B2 and U.S. Pat. No. 8,127,888B2. In order to improve the perception of internal combustion engine noise inside the passenger compartment, devices have also been proposed to amplify the exhaust noise, for example as described in patent applications DE102012109668A1 and DE10042012A1.

In the Aston Martin model DB3S car, the exhaust duct is arranged externally in an asymmetrical manner on one side of the car and ends in an outlet opening which is located between a rear drive wheel and a door.

In the Porsche 962C car, twin exhaust ducts are provided, each of which ends in an outlet opening which is arranged at one side of the car and is located between a rear drive wheel and a door.

DISCLOSURE OF THE INVENTION

The aim of the present invention is to provide a car provided with an internal combustion engine which is easy and inexpensive to manufacture and which is free of the drawbacks described above, i.e., it allows a natural and overall pleasant exhaust noise to be perceived inside the passenger compartment according to the expectations of the driver and any passengers.

According to the present invention, a car provided with a hydrogen-powered internal combustion engine is provided in accordance with the appended claims.

The claims describe preferred embodiments of the present invention forming an integral part of the present description.

BRIEF DESCRIPTION OF THE DRAWINGS

The present invention will now be described with reference to the accompanying drawings, showing some non-limiting embodiments thereof, wherein.

PREFERRED EMBODIMENTS OF THE INVENTION

Figure 1:
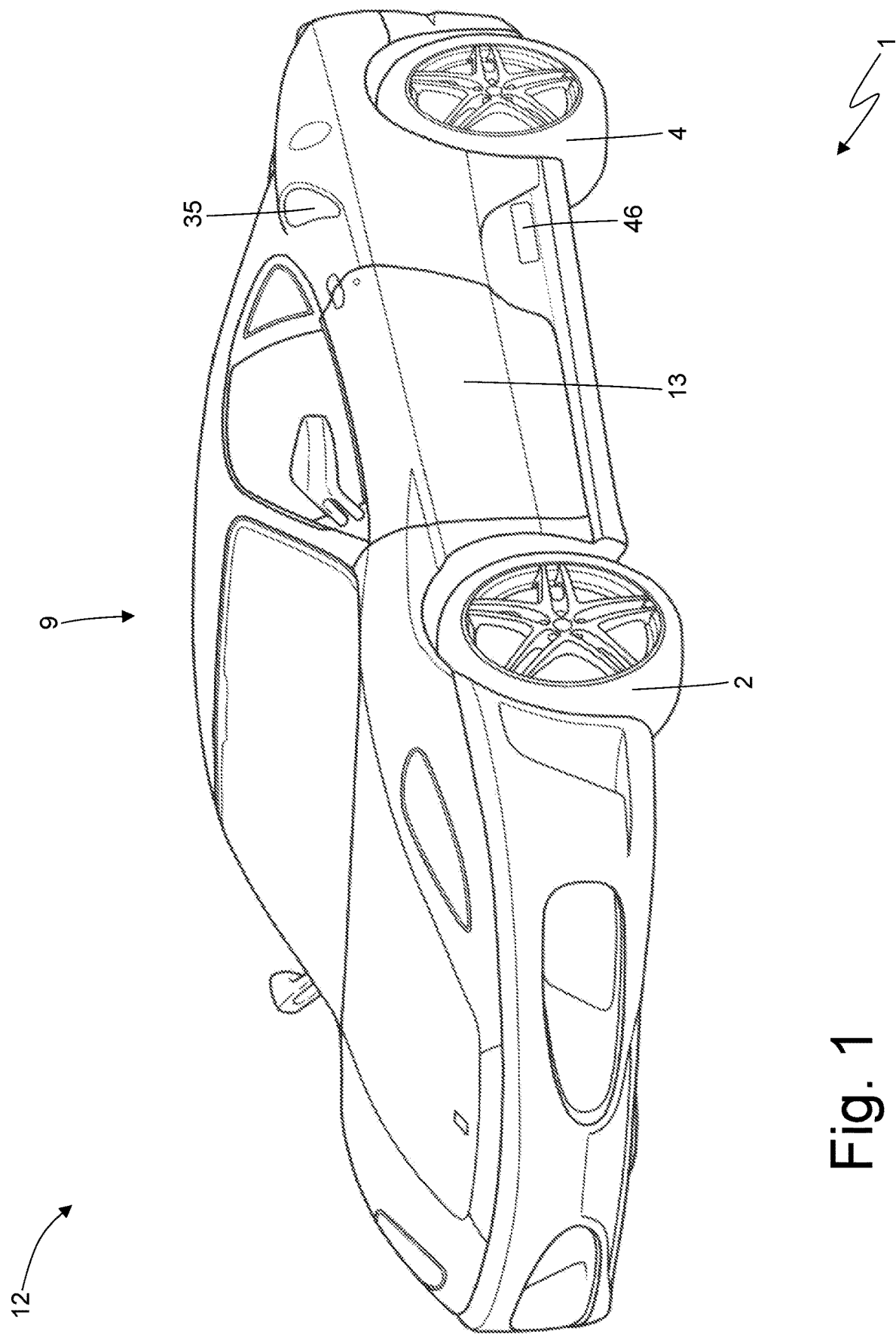
FIG. 1 is a perspective view of a car provided with an internal combustion engine.
Figure 4:
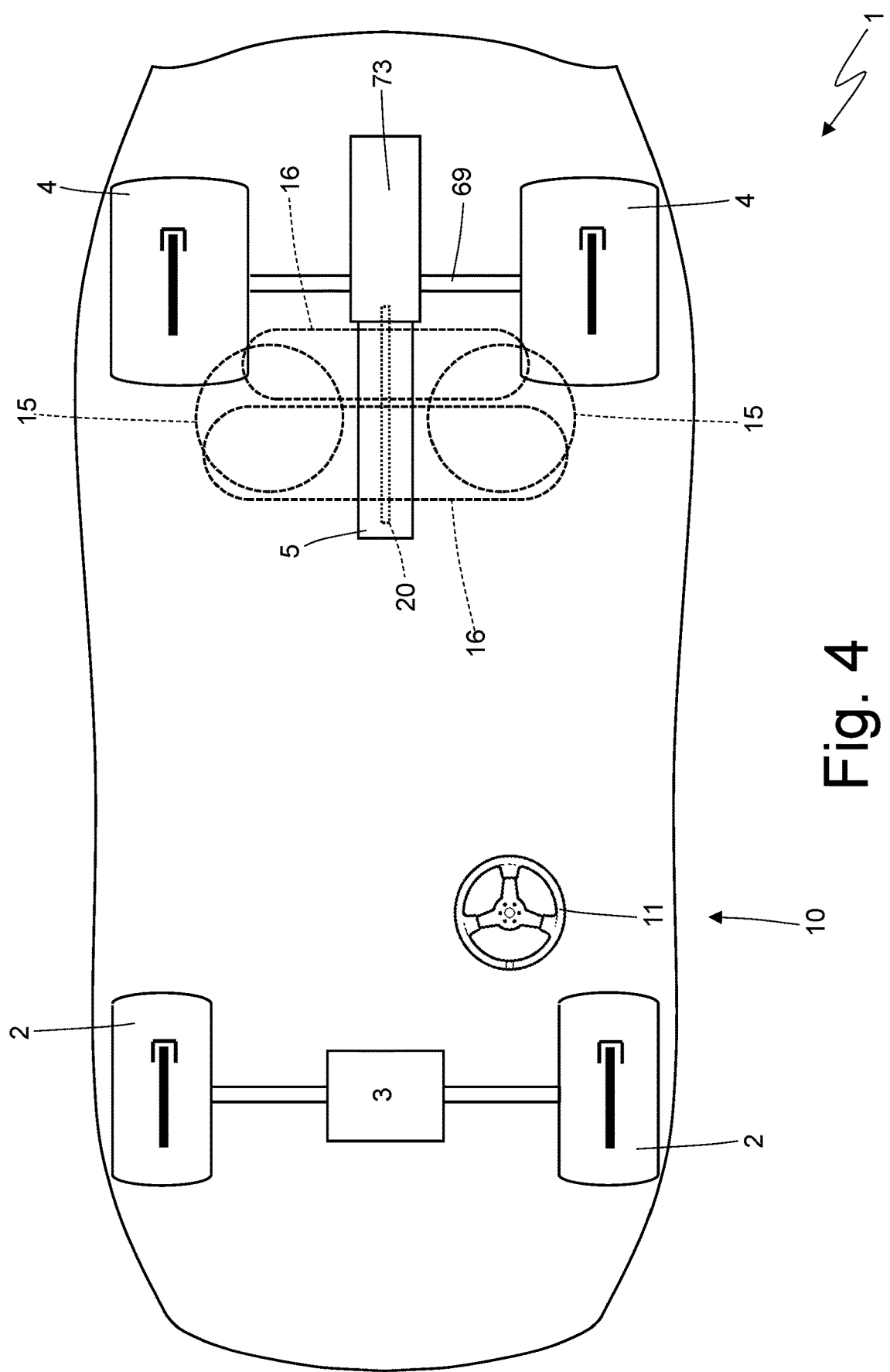
FIG. 4 is a schematic plan view of the car of FIG. 1.

In FIG. 1, the number 1 overall indicates a hybrid car (i.e., with hybrid propulsion) provided with two front drive wheels 2 receiving drive torque from (at least) one electric machine 3 (illustrated schematically in FIG. 4) and two rear drive wheels 4 receiving drive torque from an internal combustion engine 5 (illustrated schematically in FIG. 4).

Figure 15:
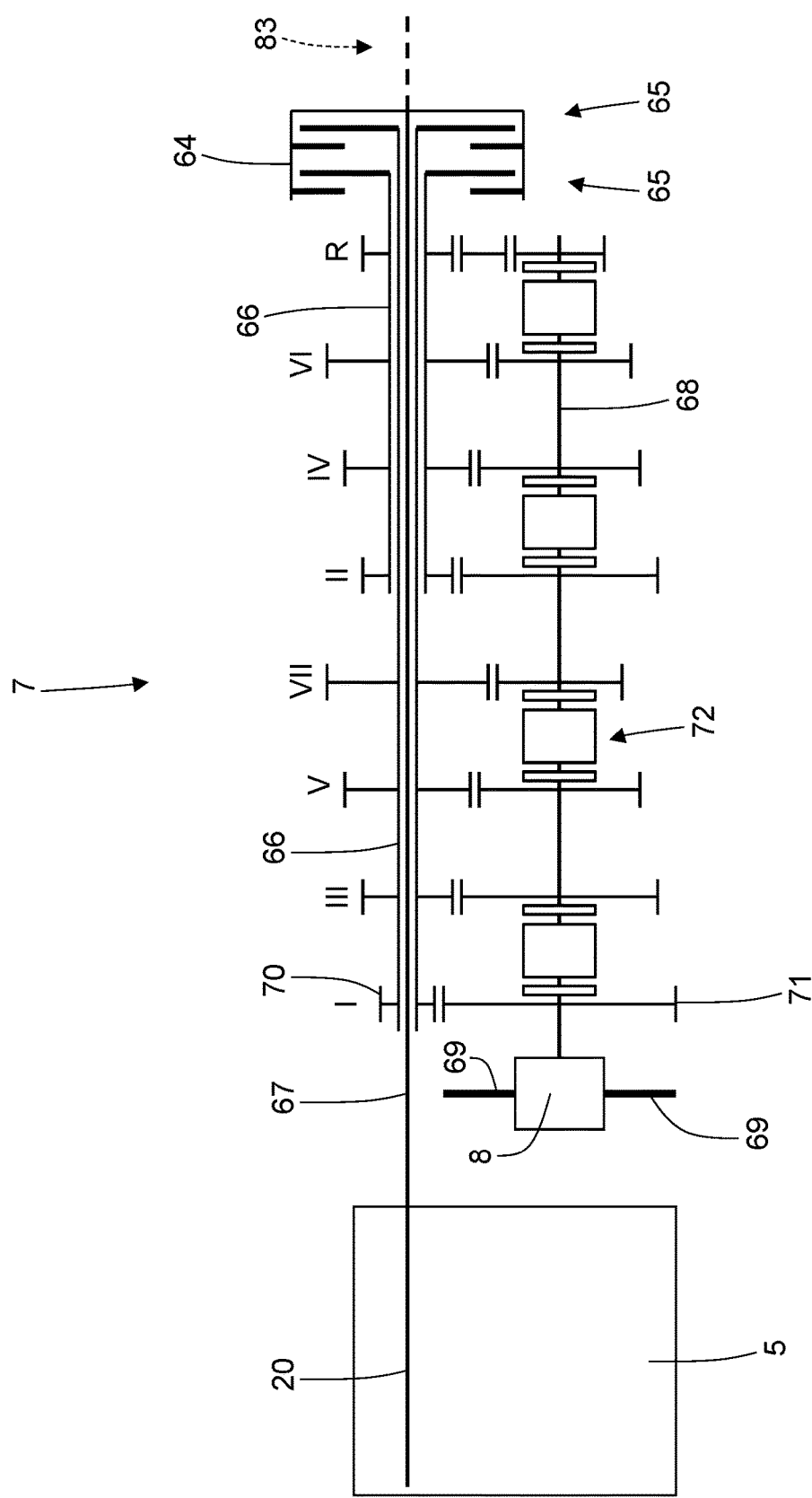
FIG. 15 is a schematic view of the transmission system of FIGS. 13 and 14.

As illustrated in FIG. 4, the electric machine 3 is connected to the two front drive wheels 2 by means of a transmission system (of known type and not illustrated) provided with a front differential; similarly, the internal combustion engine 5 is also connected to the two rear drive wheels 4 by means of a transmission system 6 provided with a transmission 7 and a rear differential 8 (illustrated schematically in FIG. 15).

Preferably, the electric machine 3 is reversible (i.e., it can operate either as an electric motor by absorbing electrical energy and generating a mechanical drive torque, or as an electric generator by absorbing mechanical energy and generating electrical energy); according to other embodiments not illustrated, the electric machine 3 is not provided.

Figure 2:
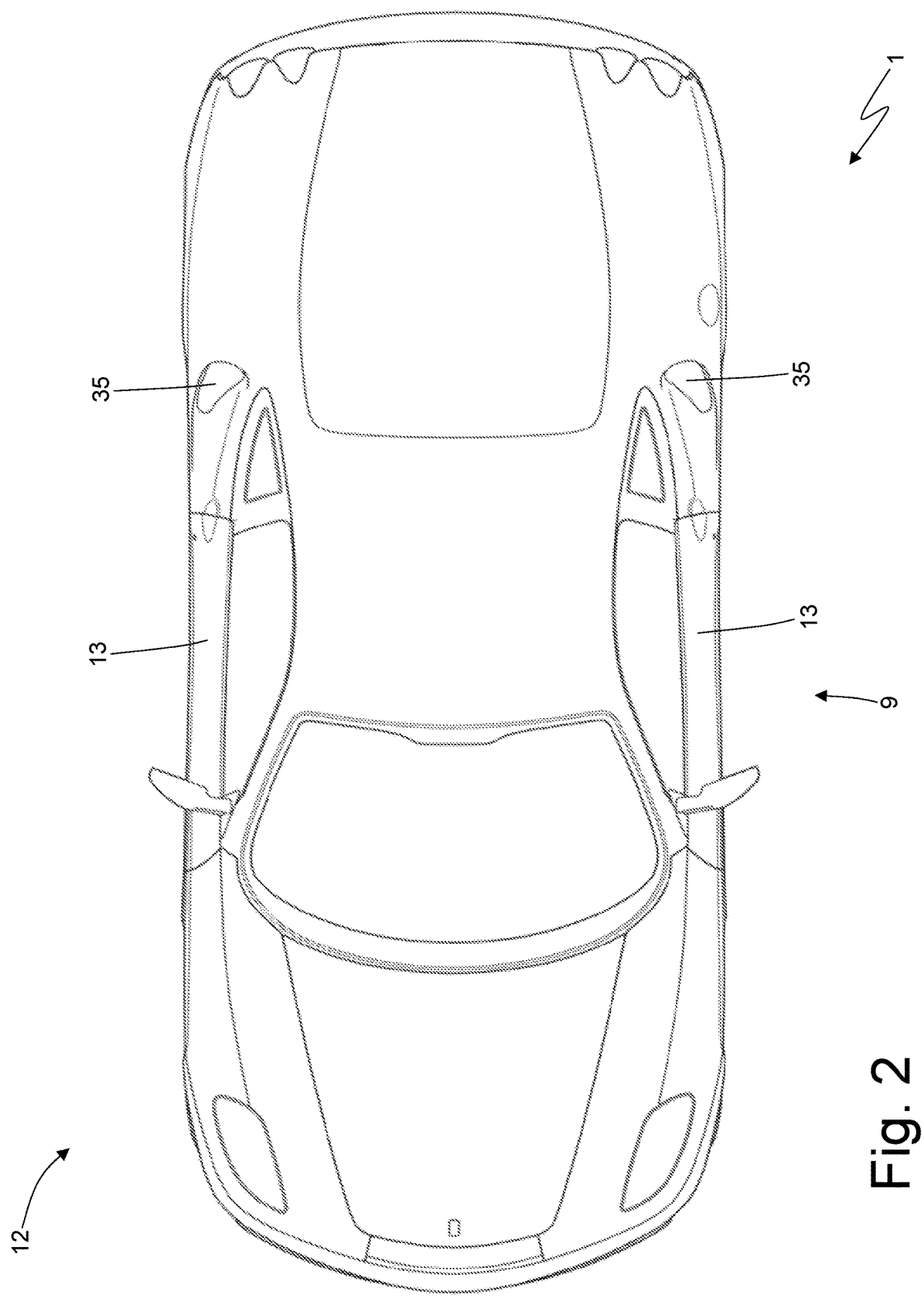
FIGS. 2 and 3 are respectively a top and a bottom view of the car of FIG. 1.

As illustrated in FIGS. 1 and 2, the car 1 comprises a passenger compartment 9 which is arranged between the two front wheels 2 and the two rear wheels 4 and contains driver's station 10 therein (schematically illustrated in FIG. 4) which is arranged on the left side (alternatively it could also be arranged on the right side). As illustrated in FIG. 4, the driver's station 10 comprises a steering wheel 11, a driver's seat (not illustrated) and a number of other (known and not illustrated) driver-operated controls (including, for example, an accelerator pedal, a brake pedal and at least one lever for selecting gears).

As illustrated in FIGS. 1 and 2, the car 1 comprises a body 12 which delimits (among other things) the passenger compartment 9 and has two sidewalls wherein at least two doors 13 are obtained. The door 13 on the left provides direct access to the driver's station 10.

Figure 3:
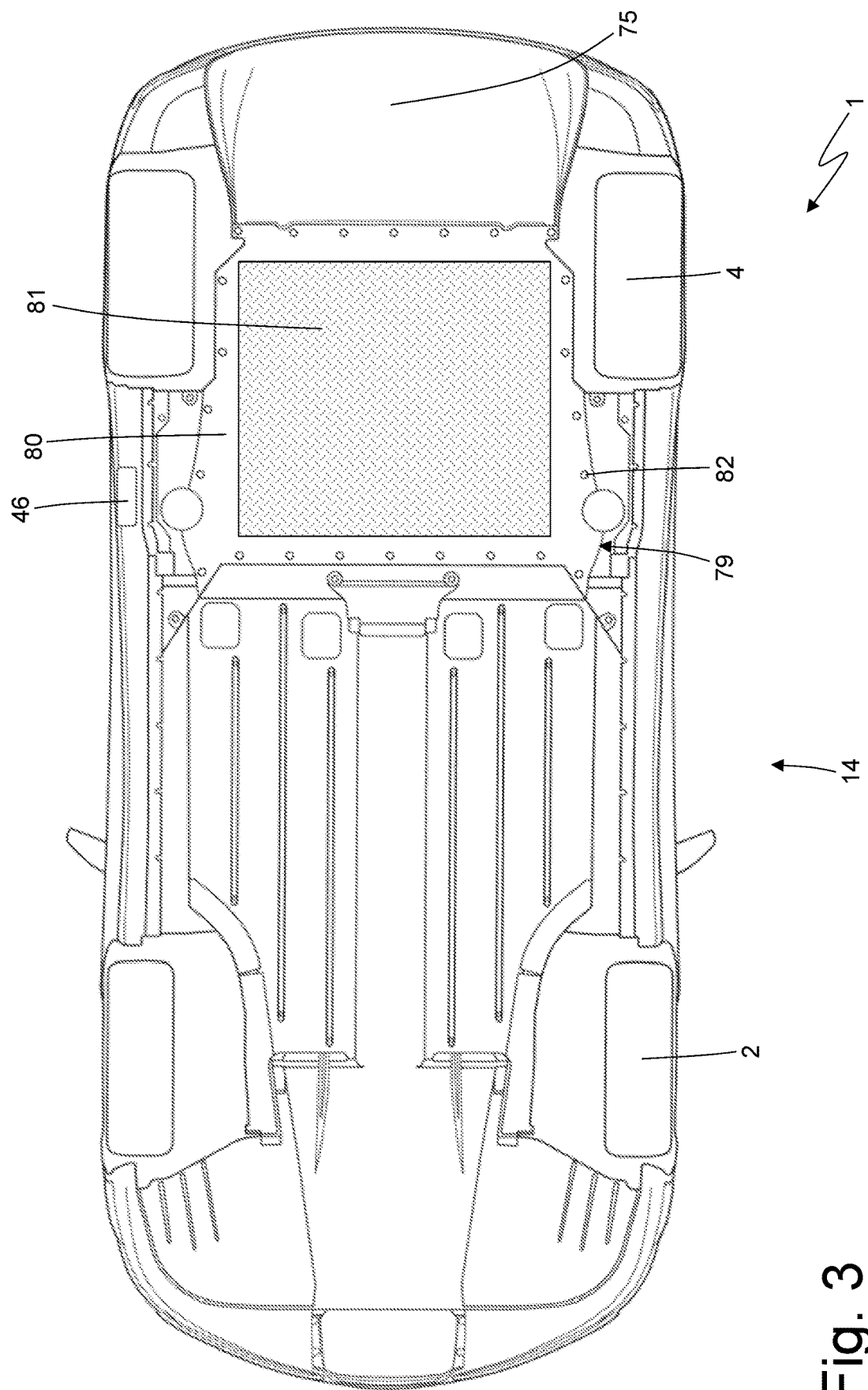

As illustrated in FIG. 3, the car 1 comprises a bottom 14 which forms the lowest part of the car 1 and in use is facing a road surface on which the car 1 moves.

According to a possible embodiment, the internal combustion engine 5 is powered by hydrogen (or also another gaseous fuel). According to a different embodiment, the internal combustion engine 5 is powered by petrol (or also another liquid fuel).

As illustrated in FIG. 4, the internal combustion engine 5 is powered by hydrogen, which is stored at high pressure (e.g., with a maximum pressure of around 700 bar) in four different tanks 15 and 16: the two tanks 15 have a spherical shape and have the same size, while the two tanks 16 have a cylindrical shape and have different sizes (i.e., one tank 16 is larger than the other tank 16).

The two tanks 15 (spherical in shape) are arranged next to a cylinder block of the internal combustion engine 5 at the two opposite sides of the internal combustion engine 5, i.e., one tank 15 is arranged to the right of the cylinder block of the internal combustion engine 5 while the other tank 15 is arranged to the left of the cylinder block of the internal combustion engine 5. In other words, the two tanks 15 (spherical in shape) are arranged at the same vertical height, are arranged at the same longitudinal height and are separated from each other transversely (with the interposition of the cylinder block of the internal combustion engine 5), i.e., they are only transversely spaced from each other.

The two tanks 16 (cylindrical in shape) are arranged above the internal combustion engine 5 one in front of the other. In other words, the two tanks 16 (cylindrical in shape) are arranged (roughly) at the same vertical height, are arranged at the same transverse height and are separated from each other longitudinally, i.e., they are only longitudinally spaced from each other (i.e., one is arranged in front of the other). In particular, both tanks 16 (cylindrical in shape) are oriented transversely, i.e., their central axes of symmetry are oriented transversely. In the embodiment illustrated in FIG. 4, the tank 16 arranged in front (i.e., closer to the front) is larger than the tank 16 arranged behind (i.e., closer to the rear).

Figure 5:
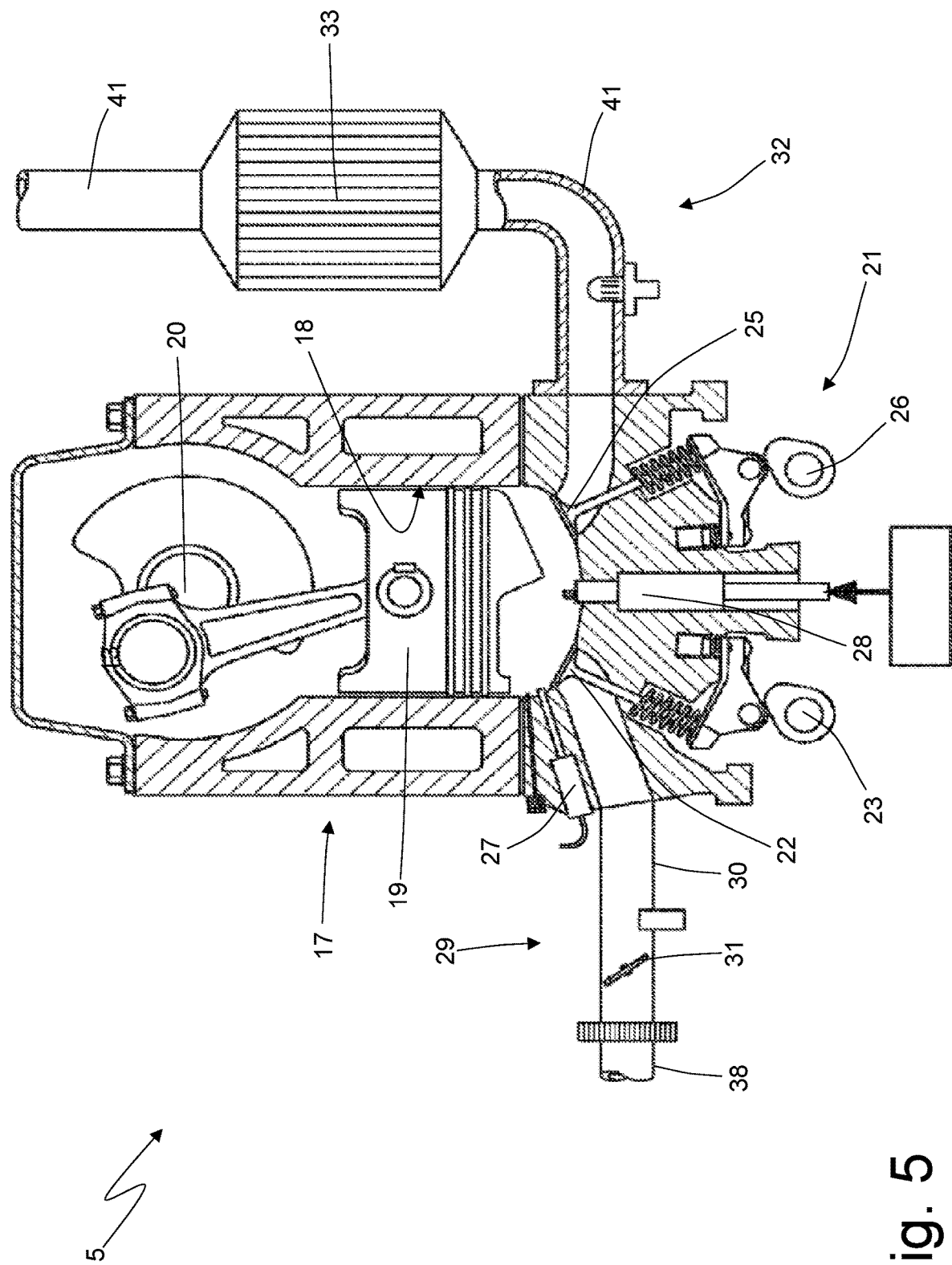
FIG. 5 is a schematic view of the internal combustion engine of the car of FIG. 1.

As illustrated in FIG. 5, the internal combustion engine 5 comprises a crankcase 17 within which a plurality of cylinders 18 (only one of which is illustrated in FIG. 5) is obtained. Preferably (but not compulsorily), the cylinders 18 are arranged in line, as this solution allows to reduce the transverse dimensions of the internal combustion engine 5 and thus, among other things, allows to leave more space for the tanks 15. In the embodiment illustrated in the accompanying drawings, six cylinders 18 are provided in line, but obviously the number and arrangement of the cylinders 18 could be different.

Each cylinder 18 has a respective combustion chamber and a respective piston 19 mechanically connected to a drive shaft 20 (by means of a respective connecting rod) to transmit the force generated by the combustion to the drive shaft 20. Coupled (connected) to the crankcase 17 is a cylinder head 21 which forms the crown of the cylinders 18 (i.e., the upper closure of the cylinders 18 with what is known as the "flame plate"). In the case of an in-line arrangement of the cylinders 18, a single cylinder head 21 is provided, while in the case of a "V" arrangement of the cylinders 18, twin cylinder heads 21 are provided for the two banks of cylinders 18.

The combination of the crankcase 17 and the cylinder head 21 constitutes the cylinder block of the internal combustion engine 5.

In the embodiment illustrated in the accompanying drawings, the internal combustion engine 5 is arranged (oriented) longitudinally, i.e., the drive shaft 20 is arranged (oriented) longitudinally, as this solution allows to reduce the transverse dimension of the internal combustion engine 5 and thus, among other things, leave more space for the tanks 15. According to other embodiments not illustrated, the internal combustion engine 5 is arranged (oriented) transversely.

In the embodiment illustrated in the appended figures, the internal combustion engine 5 is arranged in a central or rear position, i.e., the internal combustion engine 5 is arranged behind the passenger compartment 9 and is located between the front wheels 2 and the rear wheels 4 (central arrangement as illustrated in the accompanying drawings) or is located beyond the rear wheels 4 (rear arrangement not illustrated).

Each cylinder 18 comprises two intake valves 22 controlled by a camshaft 23 which receives motion from the drive shaft 20 by means of a belt drive 24 (illustrated in FIG. 26); alternatively to the belt drive 24, a chain drive or a gear drive could be used. Furthermore, each cylinder 18 comprises two exhaust valves 25 controlled by a camshaft 26 which receives motion from the drive shaft 20 by means of the belt drive 24 (illustrated in FIG. 26). The intake valves 22, exhaust valves 25 and the corresponding control means (i.e., the return springs and camshafts 23 and 26) are housed in the cylinder head 21.

Each cylinder 18 further comprises (at least) one fuel injector 27 which injects fuel into the cylinder 18 cyclically; FIG. 5 illustrates a direct fuel injection into the cylinder 18 but the fuel injection into the cylinder 18 could also be (partially or fully) indirect. Each cylinder 18 comprises (at least) one spark plug 28 which is cyclically activated to ignite the mixture of air (oxidiser) and fuel present in the combustion chamber at the end of the compression phase.

As illustrated in the accompanying drawings, the internal combustion engine 5 is oriented vertically with the drive shaft 20 arranged higher than the cylinders 18. In other words, the internal combustion engine 5 is arranged "upside down" relative to the traditional arrangement where the cylinders 18 are at the top and the drive shaft 20 is at the bottom. As a result, the cylinder head 21 which forms the crown of the cylinders 18 is arranged below the crankcase 17 and represents the lowest part of the internal combustion engine 5.

The internal combustion engine 5 comprises an intake system 29 which draws air from the outside environment to convey the air into the cylinders 18 (the intake of air into the cylinders 18 is regulated by the intake valves 22). Among other things, the intake system 29 comprises an intake manifold 30 which is directly connected to all the cylinders 18; the intake of air into the intake manifold 30 is regulated by a throttle valve 31.

The internal combustion engine 5 comprises an exhaust system 32 which releases the exhaust gases from the cylinders 18 into the external environment. Among other things, the intake system 29 comprises (at least) one exhaust gas treatment device 33 (typically a catalytic converter).

As illustrated in FIGS. 9-12, the intake system 29 comprises twin, separate intake ducts 34 which are arranged on the two sides of the car 1 (i.e., one intake duct 34 is arranged on the right side and the other intake duct 34 is arranged on the left side) and originates from respective air inlets 35 obtained through the body 12. An air filter 36 is arranged along each intake duct 34 near the respective air inlet 35. Each intake duct 34 terminates in a compressor unit 37 which increases the air pressure to increase the volumetric efficiency of the cylinders 18. A sole (single) intake duct 38 originates from the compressor unit 37, which terminates in the intake manifold 30 after passing through two intercoolers 39 and 40 arranged in series. That is, an initial section of the intake duct 38 connects the compressor unit 37 to the intercooler 39, then an intermediate section of the intake duct 38 connects the intercooler 39 to the intercooler 40, and lastly a final section of the intake duct 38 connects the intercooler 40 to the intake manifold 30.

According to a preferred embodiment, the intercooler 39 is of the air/air type and the intercooler 40 is also of the air/air type. According to a preferred embodiment, the intercooler 39 has a larger volume relative to a volume of the intercooler 40; in this regard, it is important to note that the intercooler 39 is at a disadvantage relative to the intercooler 40, since it is arranged farther from the corresponding air inlet and compensates this disadvantage both by having a larger volume, and by having to cool air with a higher inlet temperature (since the intercooler 39 receives the air directly from the compressor unit 37 while the intercooler 40, being arranged in series with the intercooler 39, receives the air which has already been partially cooled by the intercooler 39).

As illustrated in FIGS. 9-12, the exhaust system 32 comprises twin, separate exhaust ducts 41 which receive exhaust gases from the respective cylinders 18 to which they are individually connected; in particular, each exhaust duct 41 is connected to three cylinders 18 by means of respective channels which originate from the three cylinders 18 and terminate in an inlet of the exhaust duct 41 (from another viewpoint, each exhaust duct 41 is initially divided into three parts to connect with the respective three cylinders 18). A corresponding exhaust gas treatment device 33 (typically a catalytic converter) is arranged along each exhaust duct 41; thus altogether, the exhaust system 32 comprises two twin, separate exhaust gas treatment devices 33.

A turbine unit 42 is arranged along the exhaust ducts 41, provided with twin turbines 43 (better illustrated in FIG. 17), each of which is coupled to a corresponding exhaust duct 41. That is, each exhaust duct 41 passes through a respective turbine 43 and the two turbines 43 are arranged side by side to form the turbine unit 42. In other words, a turbine 43 is provided which is connected along each exhaust duct 41 and is arranged alongside the cylinder block (consisting of the crankcase 17 and the cylinder head 21) of the internal combustion engine 5.

The two exhaust ducts 41 terminate in a single common silencer 44 which receives the exhaust gases from both exhaust ducts 41. According to other embodiments not illustrated, twin, separate silencers 44 are provided, each of which receives exhaust gases only from a respective exhaust duct 41.

In the preferred embodiment illustrated in the accompanying drawings, the silencer 44 has a single final exhaust pipe 45 which opens into an outlet opening 46; according to other embodiments not illustrated, the silencer 44 has two or more final pipes 45, each of which opens into a corresponding outlet opening 46.

Figure 16:
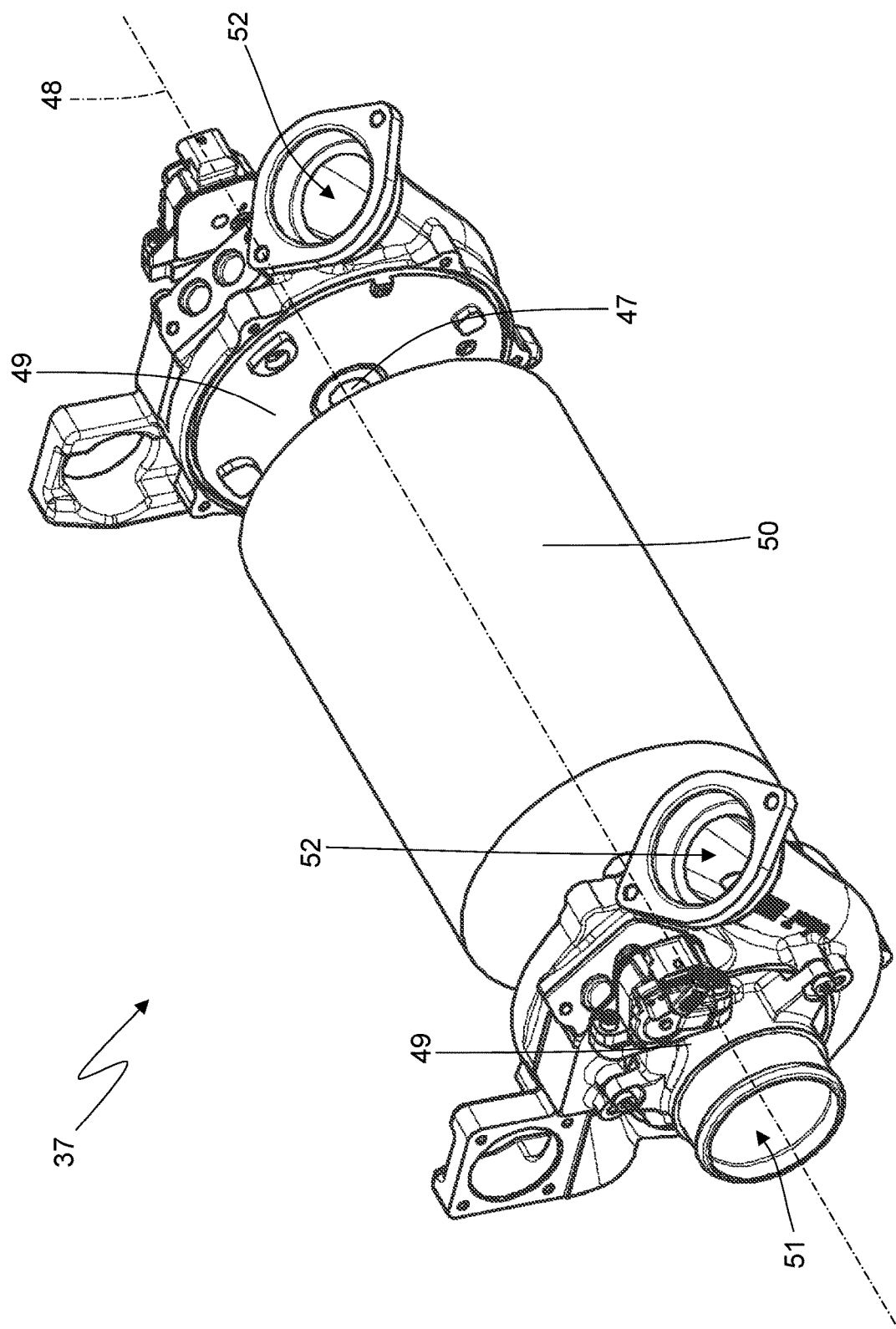
FIG. 16 is a perspective view of a compressor unit of the internal combustion engine of the car of FIG. 1.

As illustrated in FIG. 16, the compressor unit 37 (intended for use in the supercharged internal combustion engine 5) comprises a single shaft 47 mounted rotatably about a rotation axis 48. In the embodiment illustrated in the accompanying drawings, the shaft 47 (thus the rotation axis 48) is oriented transversely; according to a different embodiment not illustrated, the shaft 47 (thus the rotation axis 48) is oriented longitudinally or is inclined (non-parallel) both relative to the longitudinal direction and relative to the transverse direction.

The compressor unit 37 comprises twin (identical) compressors 49, each of which is integral with the shaft 47 to rotate together with the shaft 47 and is configured to compress air intended to be sucked in by the supercharged internal combustion engine 5; in particular, each compressor 49 receives air from a respective intake duct 34 (i.e., each intake duct 34 terminates in a corresponding compressor 49).

The compressor unit 37 comprises a single common electric motor 50 which is integral with the shaft 47 to bring the shaft 47 into rotation (and thus to bring both compressors 49 mounted on the shaft 47 into rotation). In the embodiment illustrated in the appended figures, the electric motor 50 is arranged between the two compressors 49 and is perfectly equidistant from the two compressors 49; according to a different embodiment not illustrated, the electric motor 50 is arranged on one side with respect to both compressors 49 (i.e., it is closer to one compressor 49 and is farther from the other compressor 49).

As mentioned above, the two compressors 49 are identical and are of the centrifugal type. In particular, each compressor 49 comprises an axial inlet 51 arranged on the opposite side of the shaft 47 and connected to a respective intake duct 34 and a radial outlet 52. According to a preferred embodiment, the compressor unit 37 comprises a joining duct 53 (illustrated in FIGS. 9-12) which is connected to both outlets 52 of the two compressors 49 to receive and join the compressed air from both compressors 49; the joining duct 53 terminates in the intake duct 38, i.e., the intake duct 38 starts from the joining duct 53 to receive and join the compressed air from both compressors 49.

In the embodiment illustrated in the appended figures, the joining duct 53 is oriented transversely; according to a different embodiment not illustrated, the joining duct 53 is oriented longitudinally or is inclined (non-parallel) both relative to the longitudinal direction and relative to the transverse direction.

In the embodiment illustrated in the appended figures, the joining duct 53 is oriented parallel to the shaft 47 (thus to the rotation axis 48); according to a different embodiment not illustrated, the joining duct 53 is not oriented parallel to the shaft 47, thus to the rotation axis 48).

Figure 17:
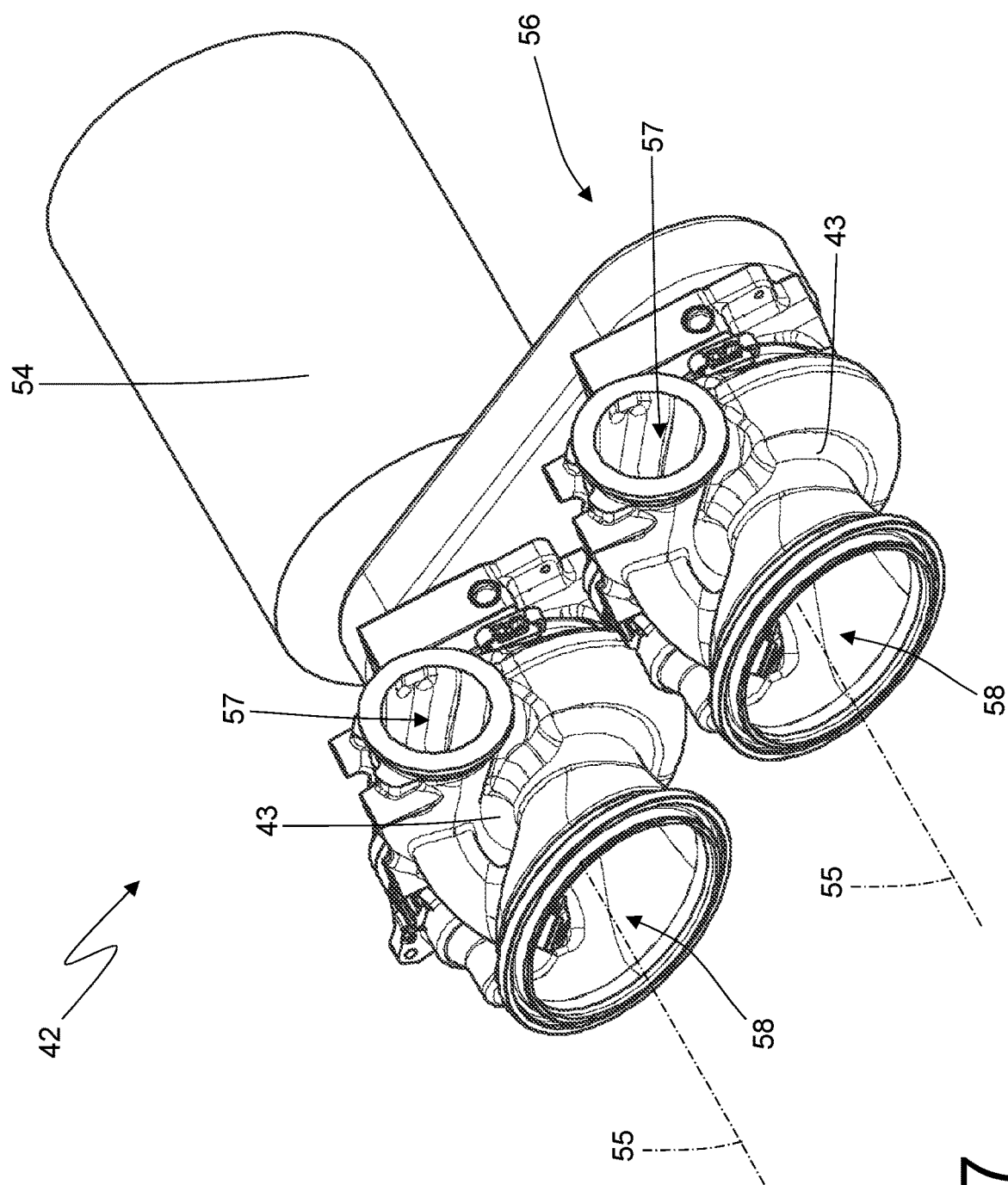
FIG. 17 is a perspective view of a turbine unit of the internal combustion engine of the car of FIG. 1.
Figure 18:
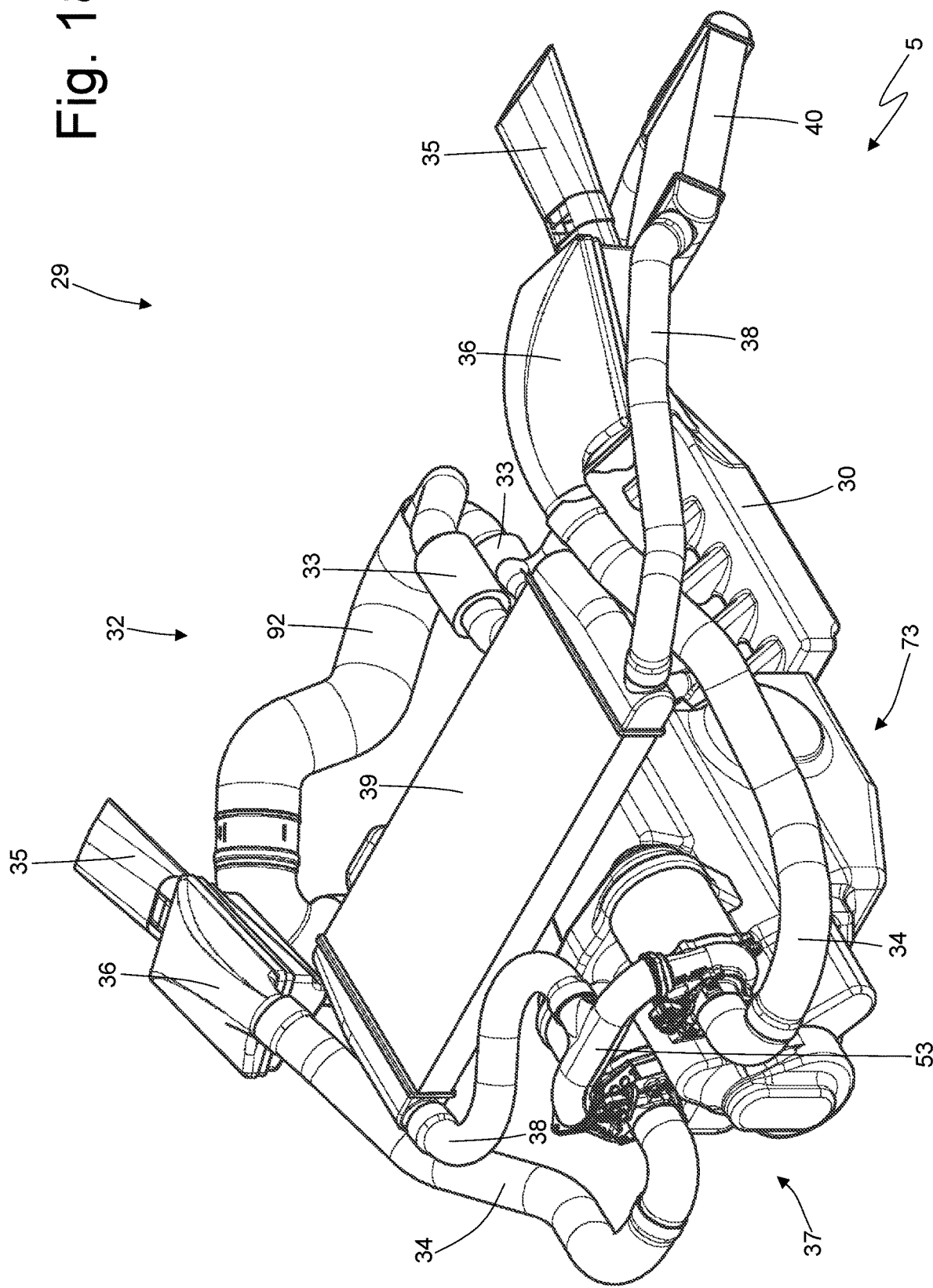
FIGS. 18-21 are respectively two different perspective views, a top and a bottom view of an alternative embodiment of the internal combustion engine.
Figure 19:
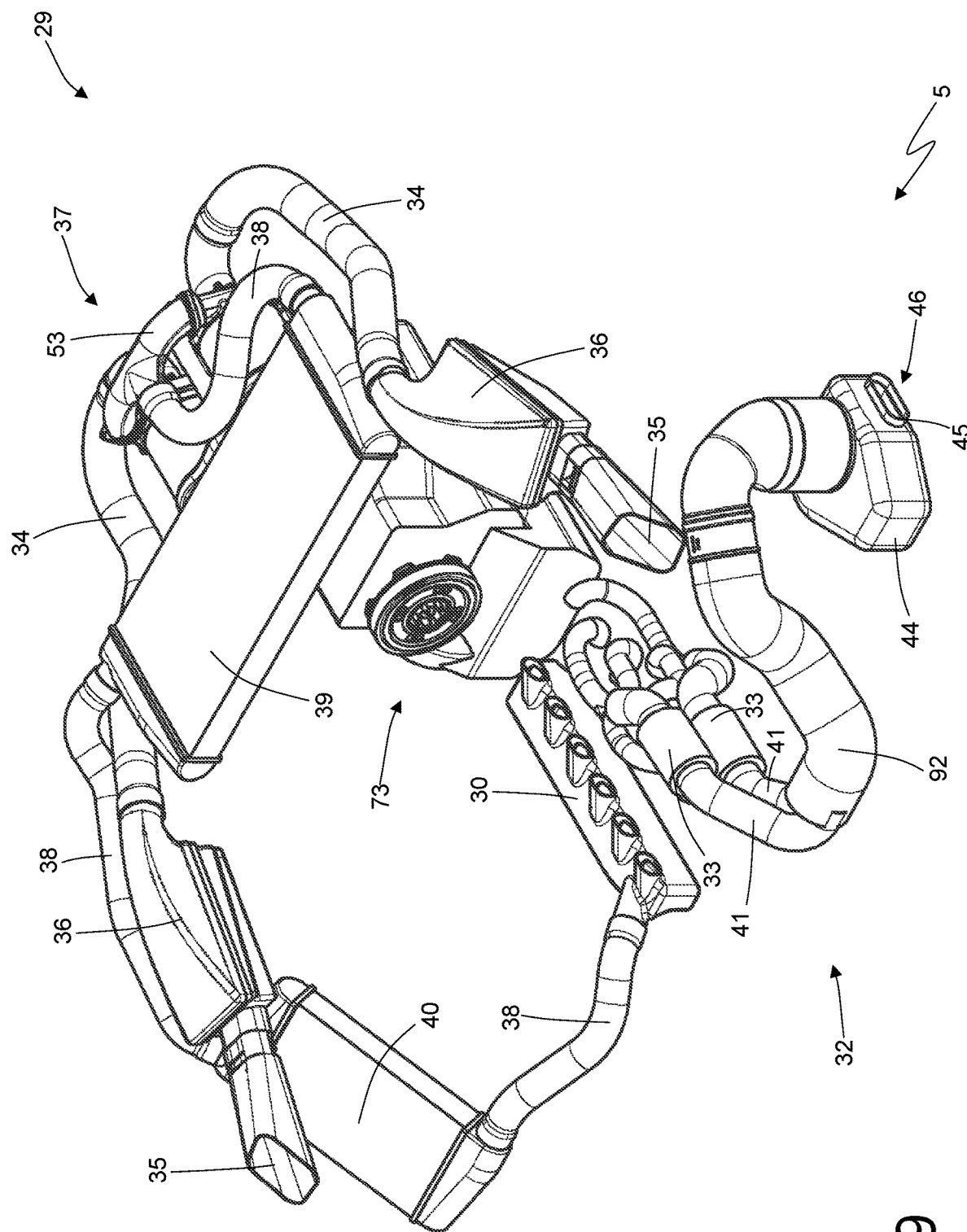
Figure 20:
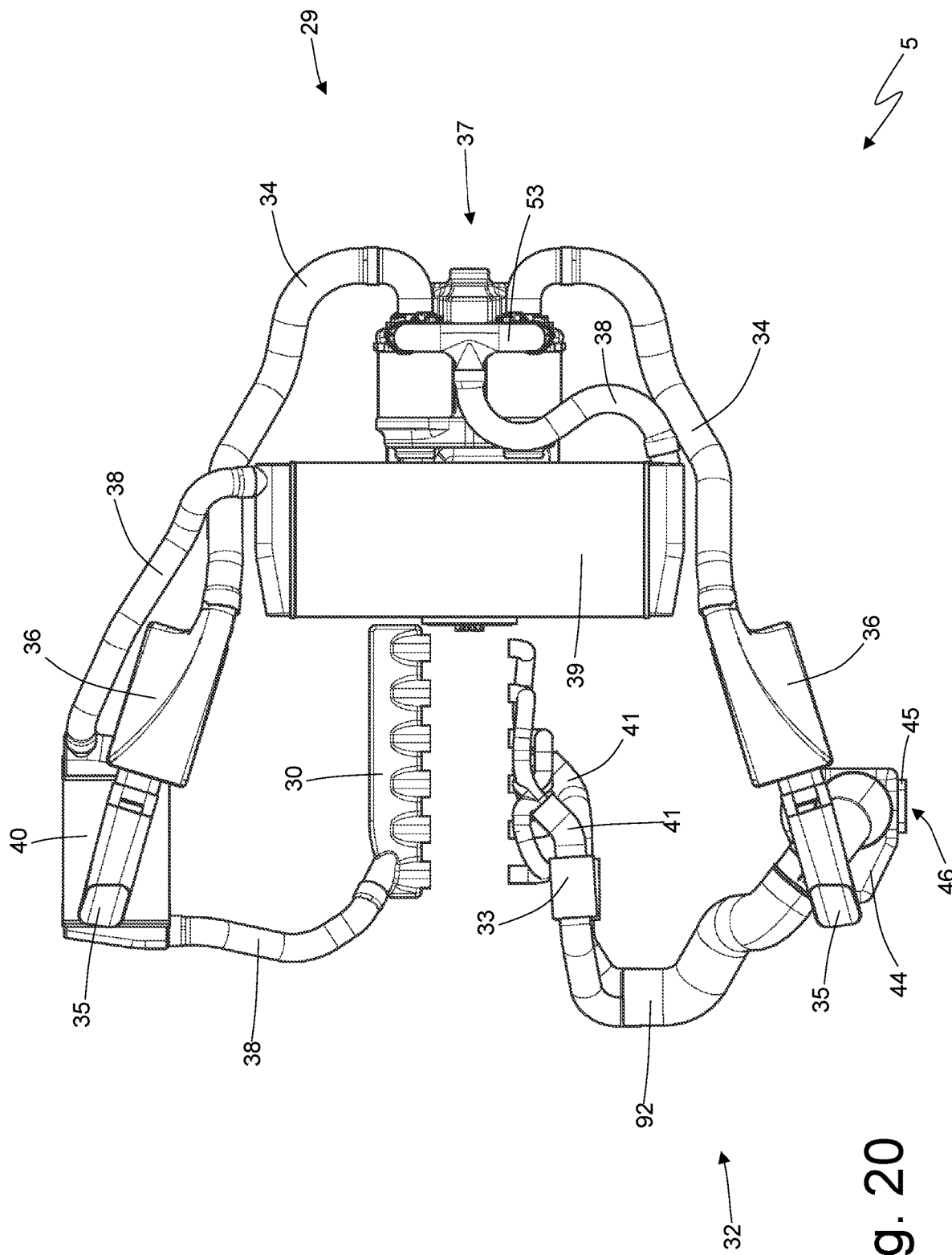
Figure 21:
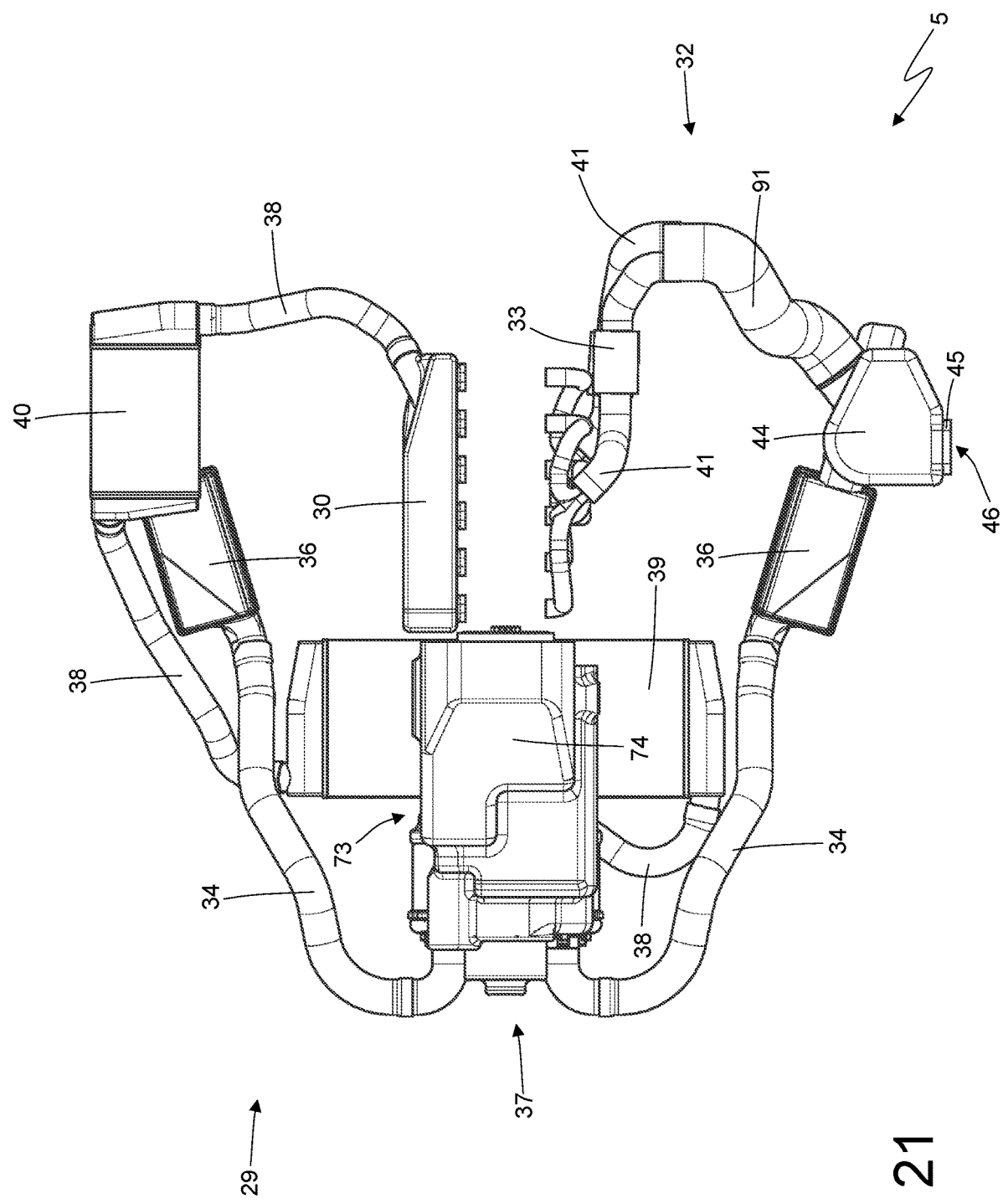

As illustrated in FIG. 17, the turbine unit 42 comprises two twin (identical) turbines 43 which drive the same electric generator 54 together. In particular, the two turbines 43 are arranged side by side and have two respective rotation axes 55 which are parallel to each other and spaced apart. The turbine unit 42 comprises a transmission device 56 which connects both turbines 43 to the same electric generator 54. The transmission device 56 comprises two toothed gears, each of which is integral with the shaft of a corresponding turbine 43 to receive the rotary motion from the turbine 43, and a connecting element (a toothed belt, a chain, a cascade of gearings) which connects the two toothed gears together in such a way as to make both toothed gears rotate together and at the same speed. According to a possible embodiment, a toothed gear of the two toothed gears of the transmission device 56 is directly coupled to a shaft of the electric generator 54 so that the electric generator 54 rotates at the same rotation speed as the two turbines 43; alternatively, a toothed gear of the two toothed gears of the transmission device 56 is connected to the shaft of the electric generator 54 by means of the interposition of a speed reducer (typically with gearings) such that the electric generator 54 rotates at a lower rotation speed than the rotation speed of the two turbines 43.

According to a preferred embodiment illustrated in the accompanying drawings, the electric generator 54 is coaxial to a turbine 43; i.e., one turbine 43 and the electric generator 54 rotate about the same first rotation axis 55 while the other turbine 43 rotates about a second rotation axis 55 which is parallel to, and spaced from, the first rotation axis 55.

The two turbines 43 are identical and are of the centrifugal type. In particular, each turbine 43 comprises a radial inlet 57 connected to one side of the respective exhaust duct 41 and an axial outlet 52 arranged on the opposite side of the transmission device 56 and connected to another side (which opens into the silencer 44) of the respective exhaust duct 41.

Figure 11:
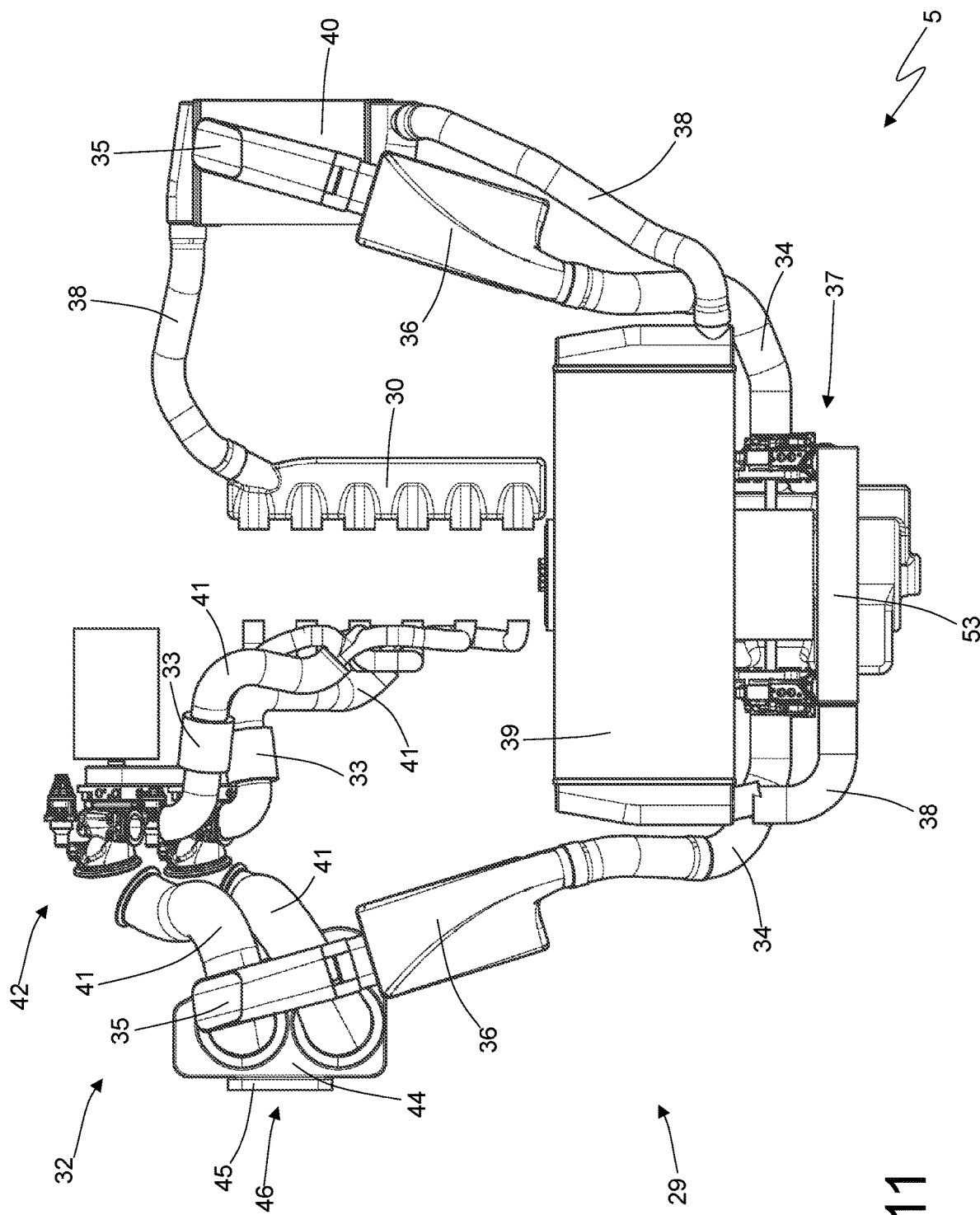
Figure 12:
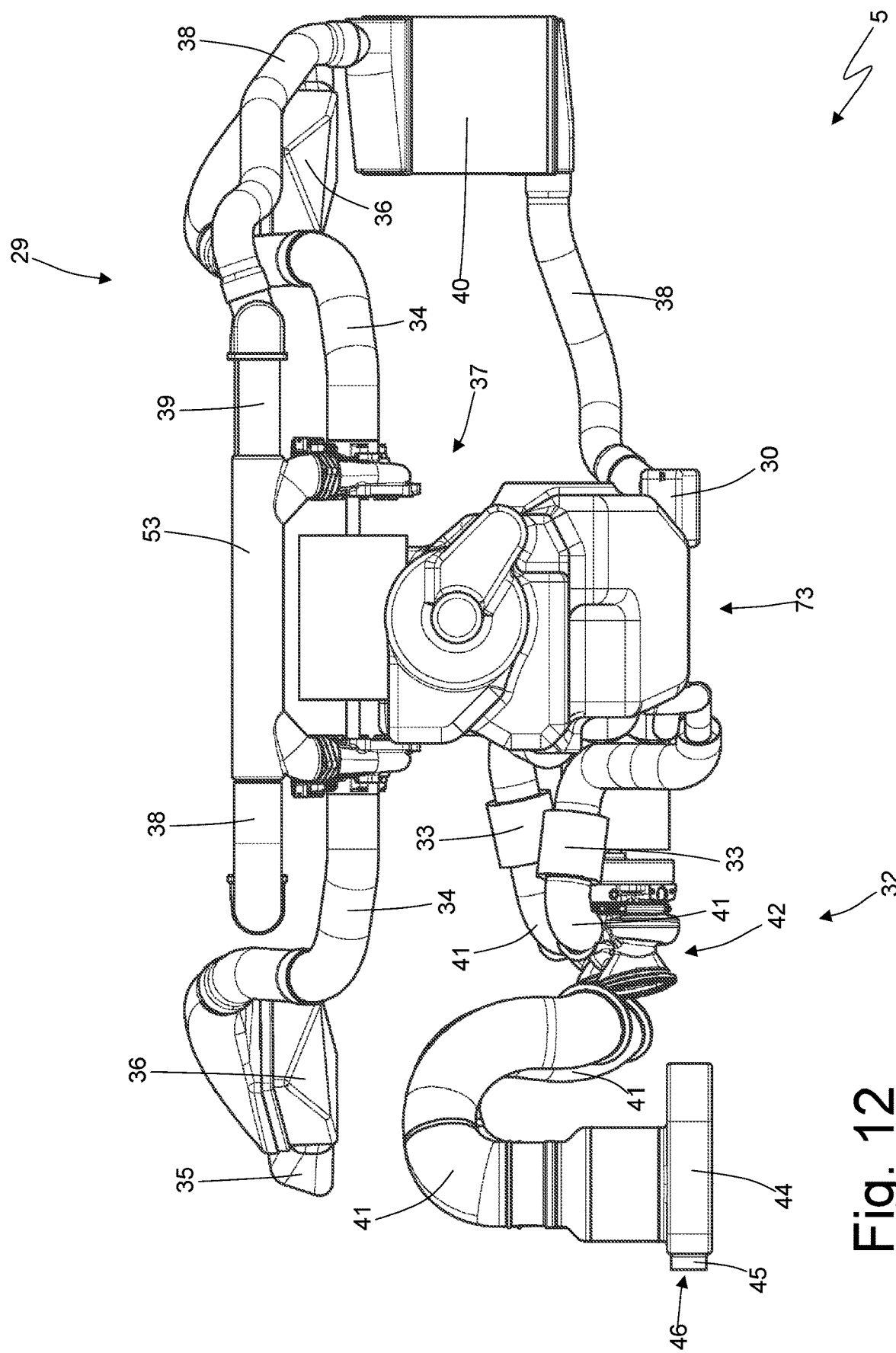

According to a preferred embodiment better illustrated in FIGS. 11 and 12, the silencer 41 is arranged next to a cylinder block (consisting of the crankcase 17 and cylinder head 21) of the internal combustion engine 5 (on the exhaust valve 25 side). The outlet opening 46 of the silencer 41 is obtained through a sidewall of the car 1 (as illustrated in FIG. 1) or, according to an alternative embodiment, through the bottom 14 of the car 1 (as illustrated in FIG. 3).

In other words, the outlet opening 46 of the silencer 44 is arranged asymmetrically at only one side of the car 1 and is located between a rear wheel 4 and a door 13. According to a preferred embodiment, the outlet opening 46 of the silencer 44 is arranged on the side where the driver's station 16 is located, so that the driver sitting in the driver's station 16 is near the outlet opening 46 of the silencer 44 and is thus in the best position to optimally hear the noise diffused through the outlet opening 46 of the silencer 44.

In the embodiment illustrated in FIG. 1, the outlet opening 46 of the silencer 44 is obtained through a sidewall of the body 12, while in the alternative embodiment illustrated in FIG. 3, the outlet opening 46 of the silencer 44 is obtained through the bottom 14.

In the embodiment illustrated in the accompanying drawings, the silencer 44 comprises a single outlet opening 46; according to other embodiments not illustrated, the silencer 44 comprises several outlet openings 46 which may be more or less side-by-side (optionally it is also possible for one outlet opening 46 of the silencer 44 to be obtained through a sidewall of the body 12 while the other outlet opening 46 of the silencer 44 is obtained through the bottom 14).

According to a preferred embodiment better illustrated in FIGS. 11 and 12, the silencer 44 is arranged on one side of the car 1 alongside a cylinder block (consisting of the crankcase 17 and cylinder head 21) of the internal combustion engine 5 and in front of a rear drive wheel 4.

According to a preferred embodiment better illustrated in FIGS. 11 and 12, the turbine unit 42 is arranged alongside a cylinder block (consisting of the crankcase 17 and cylinder head 21) of the internal combustion engine 5 (on the exhaust valve 25 side). In particular, the turbine unit 42 is arranged between the internal combustion engine 5 (i.e., between the cylinder block consisting of the crankcase 17 and cylinder head 21) and the silencer 44; thereby, the exhaust ducts 41 are particularly short and relatively untwisted.

In the embodiment illustrated in FIGS. 9-12, the compressor unit 37 (comprising the twin compressors 49) is connected between the two intake ducts 34 and 38, is arranged behind the cylinder block (comprising the crankcase 17 and cylinder head 21) of the internal combustion engine 5, is arranged higher than the cylinder block of the internal combustion engine 5, and is driven by the electric motor 50.

As better illustrated in FIGS. 9-12, the compressor unit 37 (comprising the two twin compressors 49) is arranged at the rear behind the intercooler 39 (i.e., the two compressors 49 of the compressor unit 37 are arranged at the rear behind the intercooler 39). The intercooler 39 is horizontally oriented and is arranged behind (at the rear) of the cylinder block (consisting of the crankcase 17 and cylinder head 21) of the internal combustion engine 5; in particular, the intercooler 39 is arranged higher than the cylinder block of the internal combustion engine 5 and is located behind the cylinder block of the internal combustion engine 5. Instead, the intercooler 40 (connected in series to the intercooler 39 along the intake duct 38) is arranged on one side of the car 1 next to the cylinder block (consisting of the crankcase 17 and cylinder head 21) of the internal combustion engine 5 and in front of a rear drive wheel 4. In particular, the intercooler 40 is arranged on one side of the car 1 opposite the silencer 44; i.e., the intercooler 40 and the silencer 44 are arranged on opposite sides of the car 1 separated from each other by the cylinder block (consisting of the crankcase 17 and the cylinder head 21) of the internal combustion engine 5. In other words, the intercooler 40 and silencer 44 are arranged on opposite sides of the cylinder block of the internal combustion engine 5.

Figure 28:
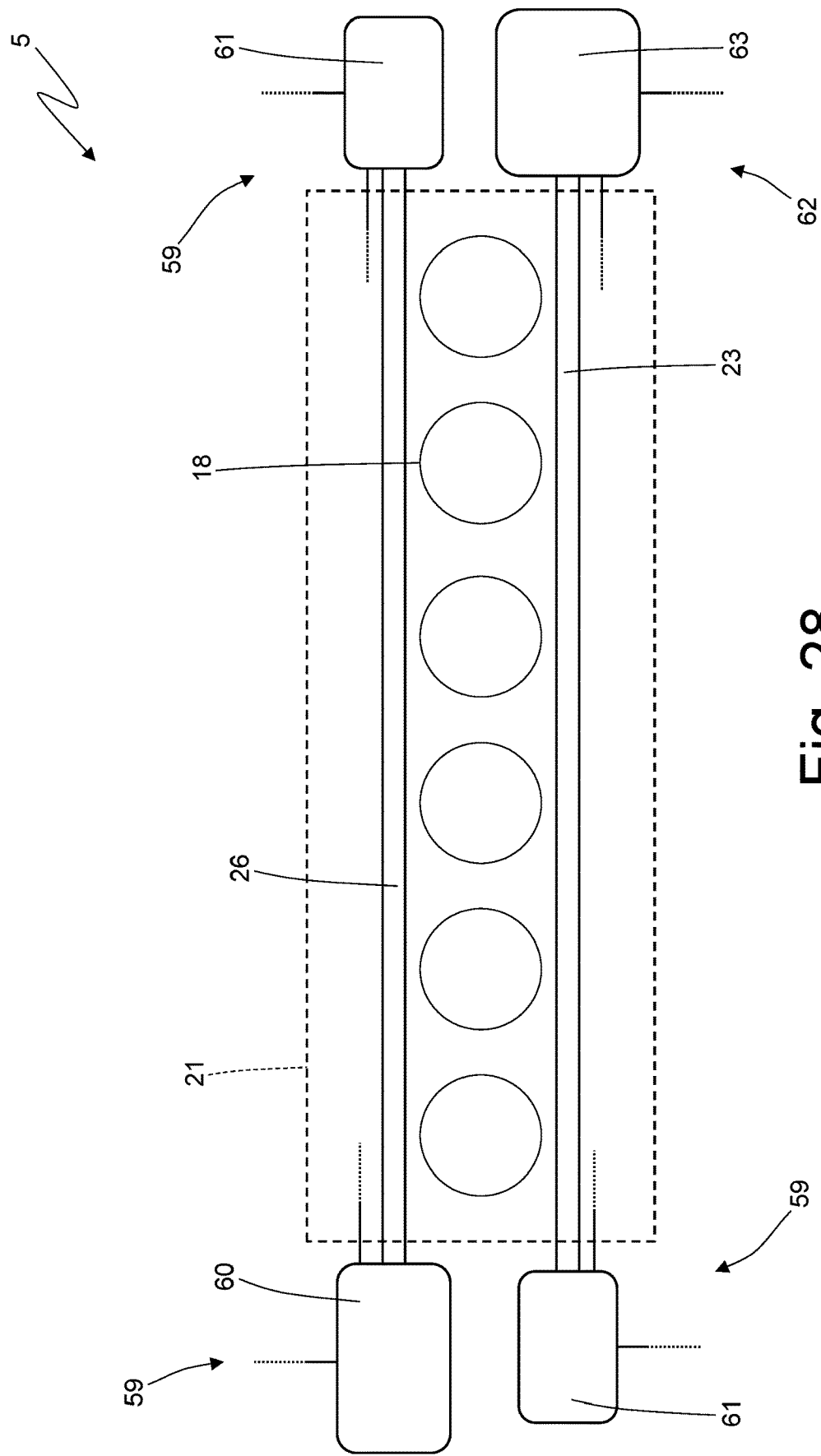

As illustrated in FIG. 28, the internal combustion engine 5 comprises a dry sump lubrication circuit 59 which circulates a lubricating oil in all the moving parts of the internal combustion engine 5. The lubrication circuit 59 comprises a delivery lubrication pump 60 configured to circulate the lubricating oil; i.e., the delivery lubrication pump 60 draws lubricating oil from an oil tank to send the lubricating oil inside the cylinder block (consisting of the crankcase 17 and cylinder head 21). The lubrication circuit 59 comprises two recovery lubrication pumps 61 configured to circulate the lubricating oil; i.e., each recovery pump 61 draws oil from the cylinder block (consisting of the crankcase 17 and cylinder head 21) and in particular from the lowest part of the cylinder block and then from the cylinder head 21 to send the lubricating oil into the tank (which is arranged higher than the cylinder head 21).

According to a preferred embodiment, the two recovery lubrication pumps 61 are arranged on opposite sides of the cylinder head 21, so that the lubricating oil is drawn from opposite areas of the cylinder head 21.

As illustrated in FIG. 28, the internal combustion engine 5 comprises a cooling circuit 62 which circulates a coolant (e.g., a mixture of water and glycol) in the cylinder block (consisting of the crankcase 17 and cylinder head 21) of the internal combustion engine 5. The cooling circuit 62 comprises a cooling pump 63 configured to circulate the coolant.

Figure 27:
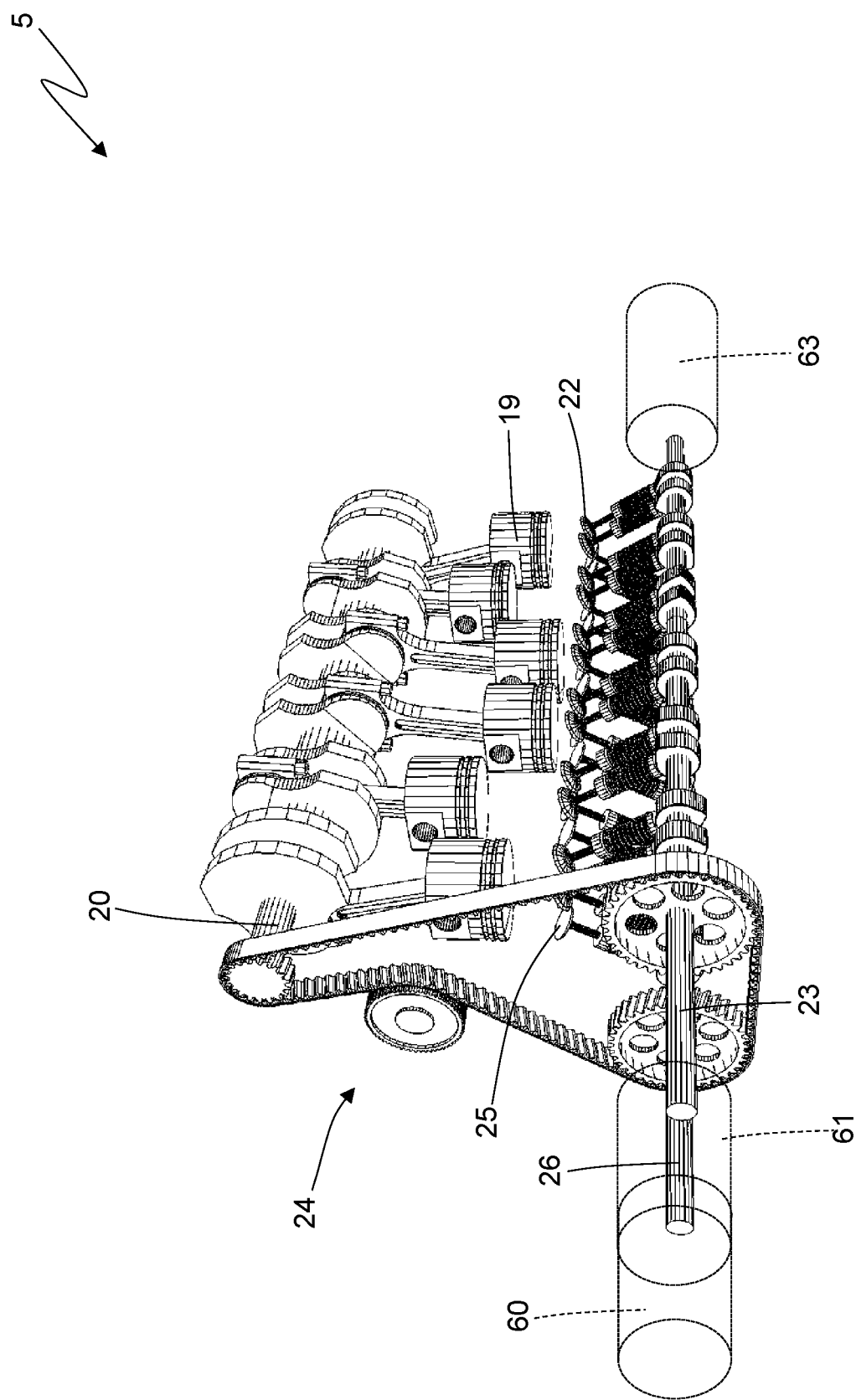
FIGS. 27 and 28 are respectively a perspective and schematic view of two camshafts of the internal combustion engine with the arrangement of lubrication pumps and a cooling pump highlighted.

As illustrated in FIGS. 27 and 28, the camshaft 23 axially exits from the cylinder head 21 on both sides: a lubrication pump 61 is arranged coaxially to the camshaft 23 and is directly connected to the camshaft 23 to be brought in rotation by the camshaft 23, and similarly the cooling pump 63 is arranged coaxially to the camshaft 23 on the opposite side of the lubrication pump 61 and is directly connected to the camshaft 23 to be brought in rotation by the camshaft 23.

As illustrated in FIGS. 27 and 28, the camshaft 26 protrudes axially exits from the cylinder head 21 on both sides: the other lubrication pump 61 (different from the lubrication pump 61 connected to the camshaft 23) is arranged coaxially to the camshaft 26 and is directly connected to the camshaft 26 to be brought in rotation by the camshaft 26, and similarly the lubrication pump 60 is arranged coaxially to the camshaft 26 on the opposite side of the lubrication pump 61 and is directly connected to the camshaft 26 to be brought in rotation by the camshaft 26.

Thereby, all four pumps 60, 61 and 63 are coaxial to the respective camshafts 23 and 26 and are brought directly in rotation by the respective camshafts 23 and 26.

According to other embodiments not illustrated, the number of pumps 60, 61 and 63 is different (smaller) because, for example, only a delivery lubrication pump 61 could be provided; in this case (at least) one camshaft 23 or 26 exits axially from the cylinder head 21 on one side only.

According to other embodiments not illustrated, the arrangement of the pumps 60, 61 and 63 could be different, i.e., they could vary: for example, the cooling pump 63 could be connected to the camshaft 26 or the lubrication pump 60 could be connected to the camshaft 23.

As illustrated in FIG. 15, the transmission 7 is directly connected to the drive shaft 20 of the internal combustion engine 5, is aligned with the internal combustion engine 5, and is arranged behind the internal combustion engine 5. In particular, the transmission 7 is vertically aligned with an upper part of the cylinder block of the internal combustion engine 5; i.e., the transmission 7 is vertically aligned with the upper part of the crankcase 17.

The transmission 7 is dual-clutch and is interposed between the drive shaft 20 of the internal combustion engine 5 and the rear drive wheels 4. The transmission 7 comprises a drum 64 which is brought in rotation by the drive shaft 20 and two clutches 65 contained one next to the other in the drum 64 to receive motion from the drum 64. Furthermore, the transmission 7 comprises two primary shafts 66 which are coaxial with each other, are inserted one inside the other, and are each connected to a corresponding clutch 65 to receive motion from the corresponding clutch 65. Each clutch 65 comprises driving discs which are integral with the drum 64 (thus they always rotate together with the drive shaft 20 to which the drum 64 is constrained) and driving discs which are interspersed with the driving discs and are integral with the corresponding primary shafts 66 (thus they always rotate together with the corresponding primary shafts 66).

The drum 64 of the transmission 7 with dual-clutch 65 is arranged on the opposite side of the internal combustion engine 5 (i.e., the drive shaft 20) relative to the two primary shafts 66; furthermore, the transmission 7 with dual-clutch 65 comprises a transmission shaft 67 which connects the drive shaft 20 to the drum 64, is coaxial to the two primary shafts 66, and is inserted within the two primary shafts 66. In other words, the transmission shaft 67 terminates at an end wall of the drum 64 and is constrained to the end wall of the drum 64. In particular, a first primary shaft 66 is arranged on the outside, the transmission shaft 67 is arranged on the inside, and the other (second) primary shaft 66 is arranged between the transmission shaft 67 and the first primary shaft 66. In other words, from the inside outwards, there is the transmission shaft 67 (which is in the centre) and successively the two primary shafts 66 (which are inserted one inside the other and both surround the transmission shaft 67).

According to a preferred embodiment illustrated in the accompanying drawings, the primary shafts 66 and the transmission shaft 67 of the transmission 7 are coaxial with the drive shaft 20 of the internal combustion engine 5; i.e., the internal combustion engine 5 is aligned with the transmission 7.

The transmission 7 with dual-clutch 65 comprises a single secondary shaft 68 connected to the differential 8 which transmits motion to the rear drive wheels 4; according to an alternative and equivalent embodiment, the dual-clutch transmission 7 comprises two secondary shafts 68 both connected to the differential 8. A pair of axle shafts 69, each of which is integral with a rear drive wheel 4, depart from the differential 8.

The transmission 7 has seven forward gears indicated with Roman numerals (first gear I, second gear II, third gear III, fourth gear IV, fifth gear V, sixth gear VI and seventh gear VII) and one reverse gear (indicated with the letter R). Each primary shaft 66 and secondary shaft 68 is mechanically coupled to each other by means of a plurality of gearings, each of which defines a respective gear and comprises a primary toothed gear 70 mounted on the primary shaft 66 and a secondary toothed gear 71 mounted on the secondary shaft 68. To allow the correct operation of the transmission 7, all the odd gears (first gear I, third gear III, fifth gear V, seventh gear VII) are coupled to the same primary shaft 66, while all the even gears (second gear II, fourth gear IV, and sixth gear VI) are coupled to the other primary shaft 66.

Each primary toothed gear 70 is keyed to a respective primary shaft 66 to always rotate integrally with the primary shaft 66 and permanently meshes with the respective secondary toothed gear 71; instead, each secondary toothed gear 71 is mounted idle on the secondary shaft 68. Furthermore, the transmission 7 comprises four dual synchronisers 72, each of which is coaxially mounted on the secondary shaft 68, is arranged between two secondary toothed gears 19, and is adapted to be actuated to alternately engage the two respective secondary toothed gears 19 to the secondary shaft 68 (i.e., to alternately make the two respective secondary toothed gears 19 angularly integral with the secondary shaft 68). In other words, each synchroniser 72 can be moved in one direction to engage a secondary toothed gear 71 to the secondary shaft 68, or it can be moved in the other direction to engage the other secondary toothed gear 71 to the secondary shaft 68.

Figure 13:
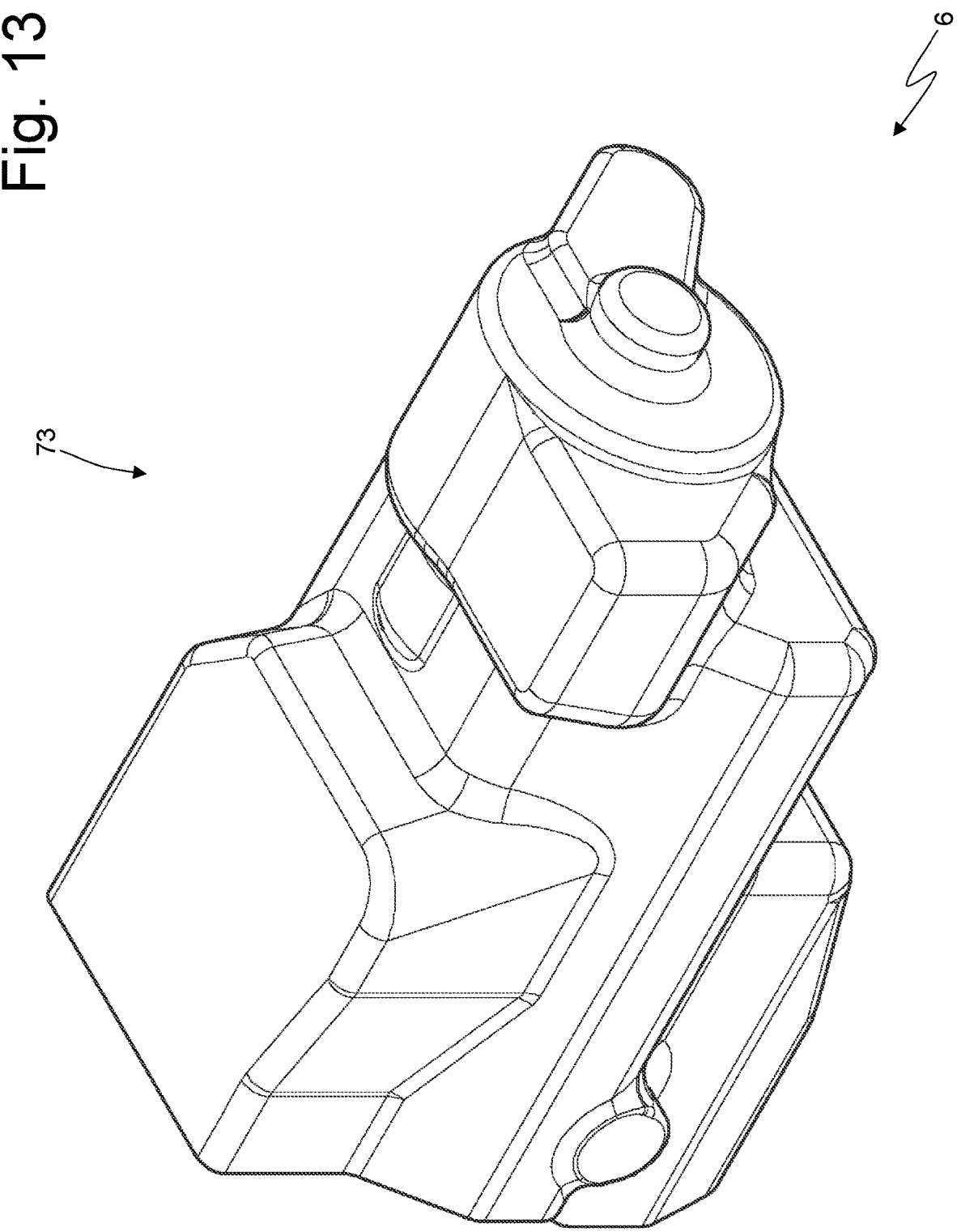
FIGS. 13 and 14 are respectively a perspective and side view of a transmission system of the car of FIG. 1.
Figure 14:
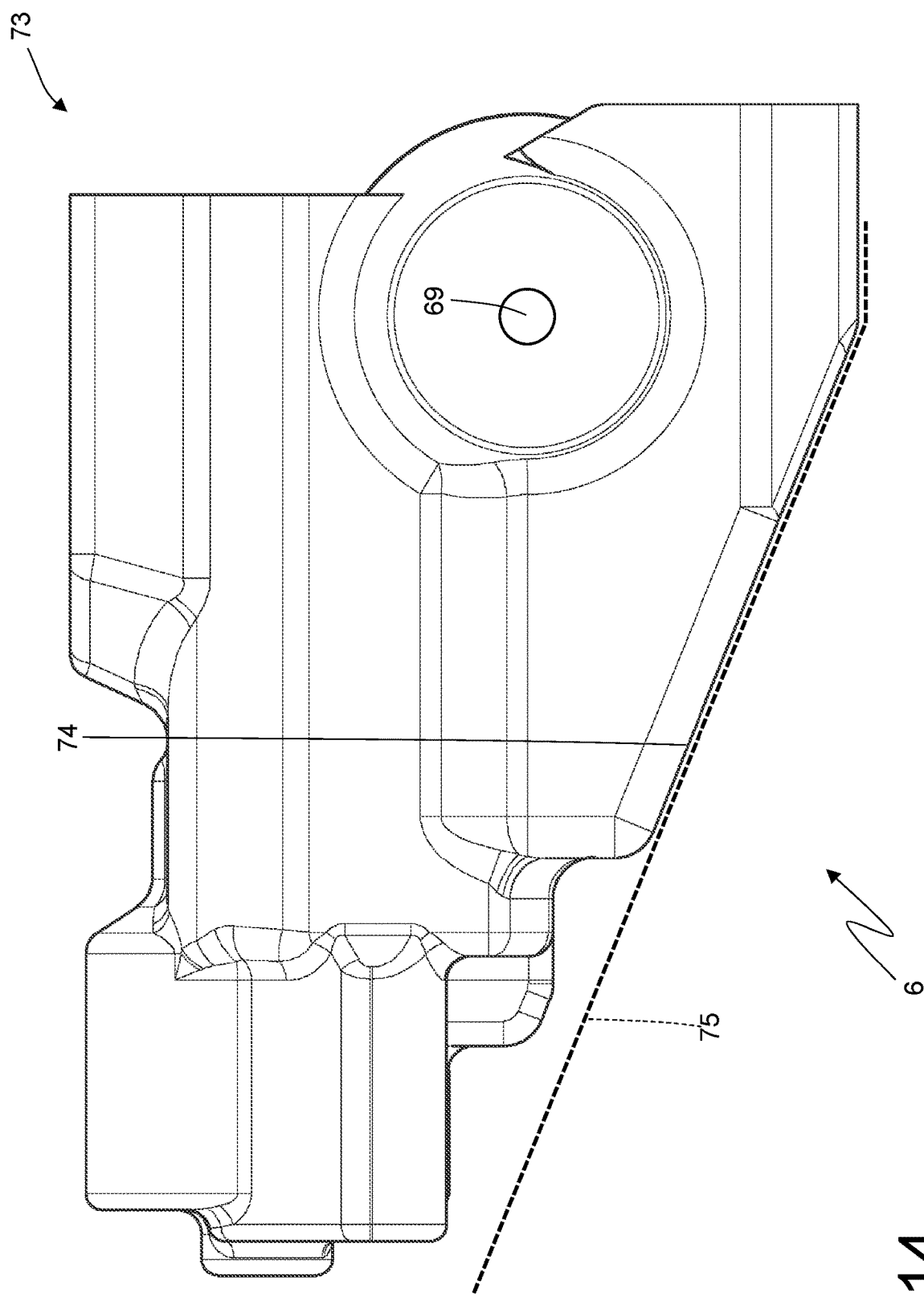

According to what is illustrated in FIGS. 13 and 14, the car 1 comprises a containing body 73 which (also) contains the dual-clutch transmission 7 therein and has a tapered shape towards the rear so that the height of the containing body 73 progressively reduces from the front to the rear. That is, a front wall of the containing body 73 has a greater extension in height than a rear wall of the containing body 73. In particular, the containing body 73 has a bottom wall 74 at the bottom which is inclined relative to the horizontal due to the tapered shape of the containing body 73.

The differential 8 (which receives motion from the secondary shaft 68 of the transmission 7 and transmits the motion to the two rear drive wheels 4 by means of the two respective axle shafts 69) is arranged inside the containing body 73 at the front and below the transmission 7. The two axle shafts 69 exit laterally from the containing body 73.

From the foregoing, we can summarise that the transmission 7 is directly connected to the drive shaft 20 of the internal combustion engine 5, is aligned with the internal combustion engine 5 (i.e., the primary shafts 66 and the transmission shaft 67 of the transmission 7 are coaxial with the drive shaft 20 of the internal combustion engine 5), and is arranged behind the internal combustion engine 5; furthermore, the intercooler 39 is arranged horizontally above the transmission 7 (i.e., above the containing body 37 wherein the transmission 7 is located).

Figure 7:
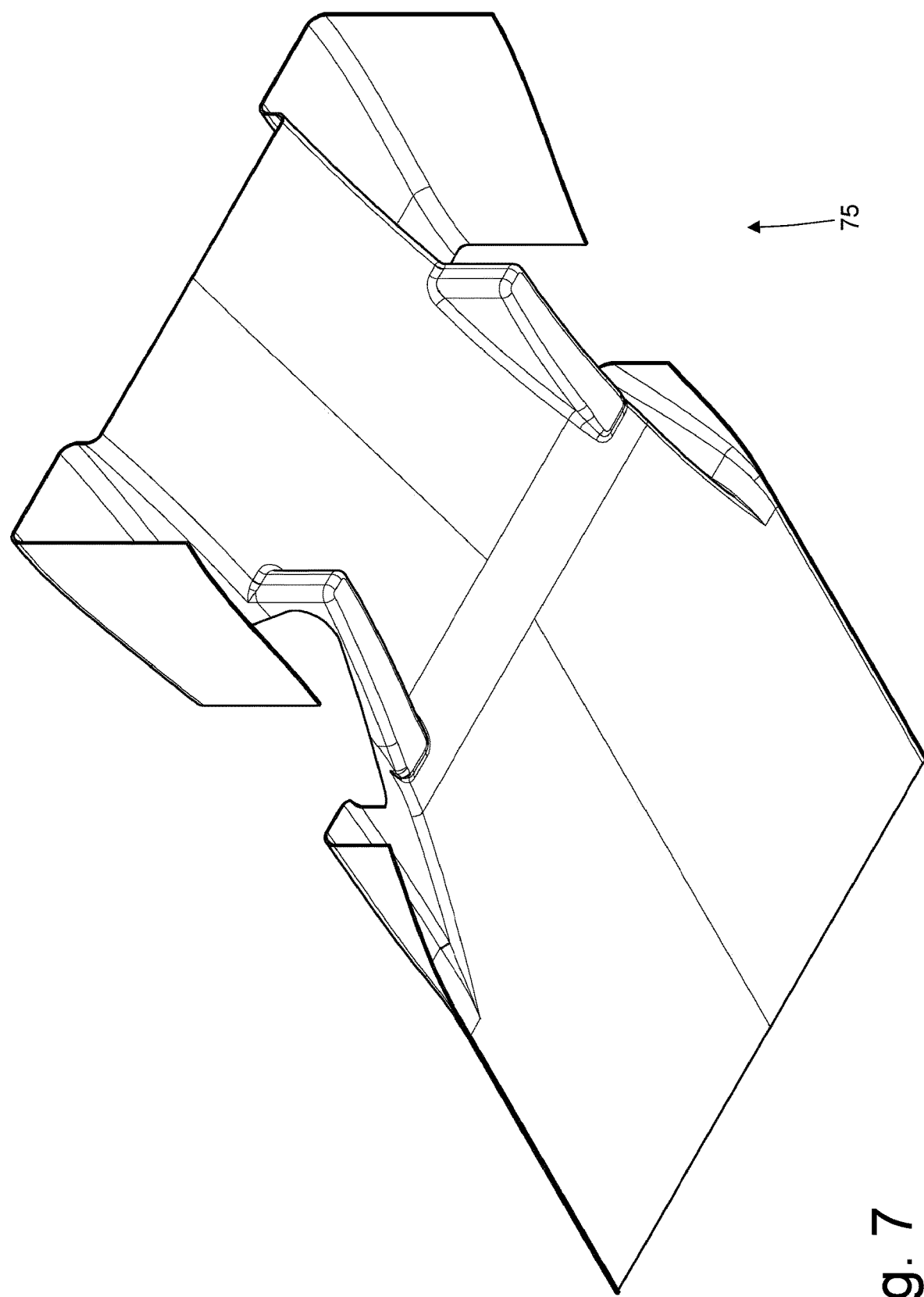
FIGS. 7 and 8 are respectively a perspective and side view of an aerodynamic diffuser of the car of FIG. 1.
Figure 8:
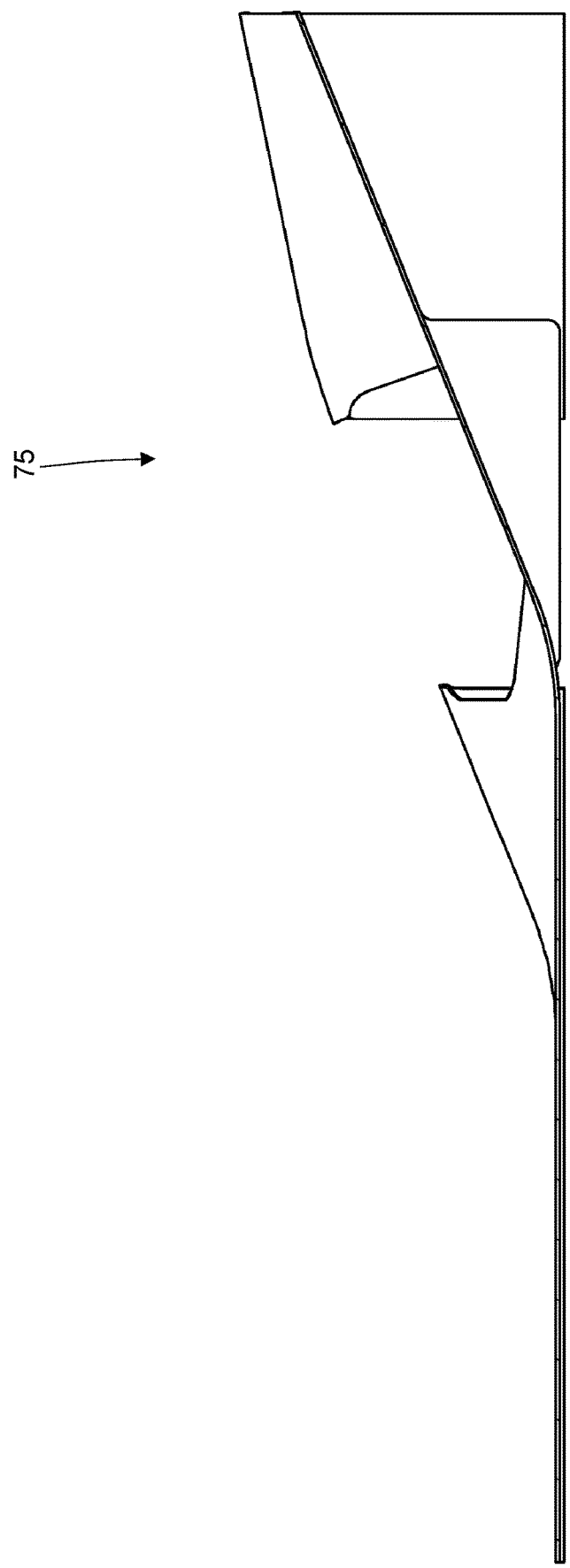
Figure 9:
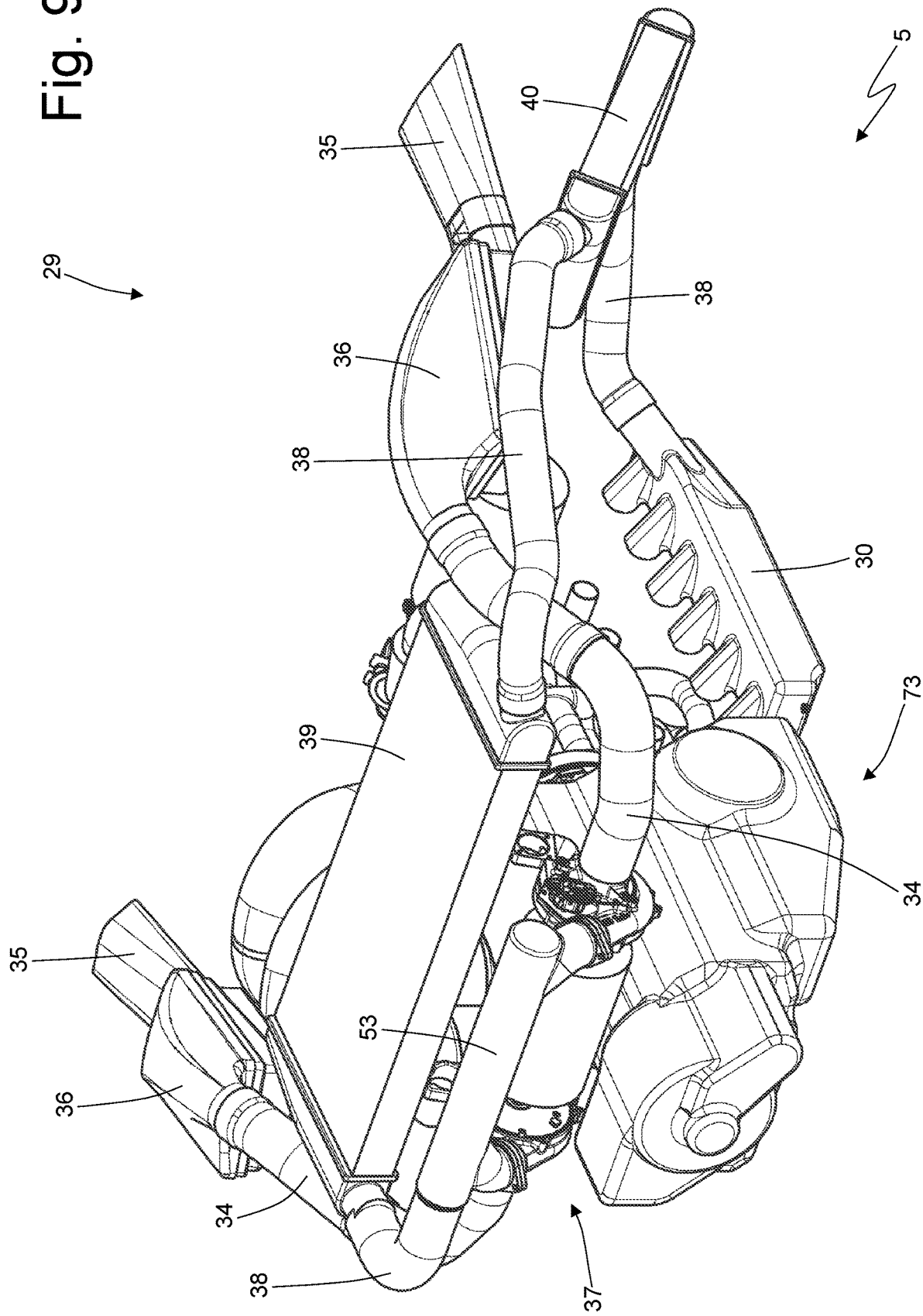
FIGS. 9-12 are respectively two different perspective views, a top view and a rear view of the internal combustion engine.
Figure 10:
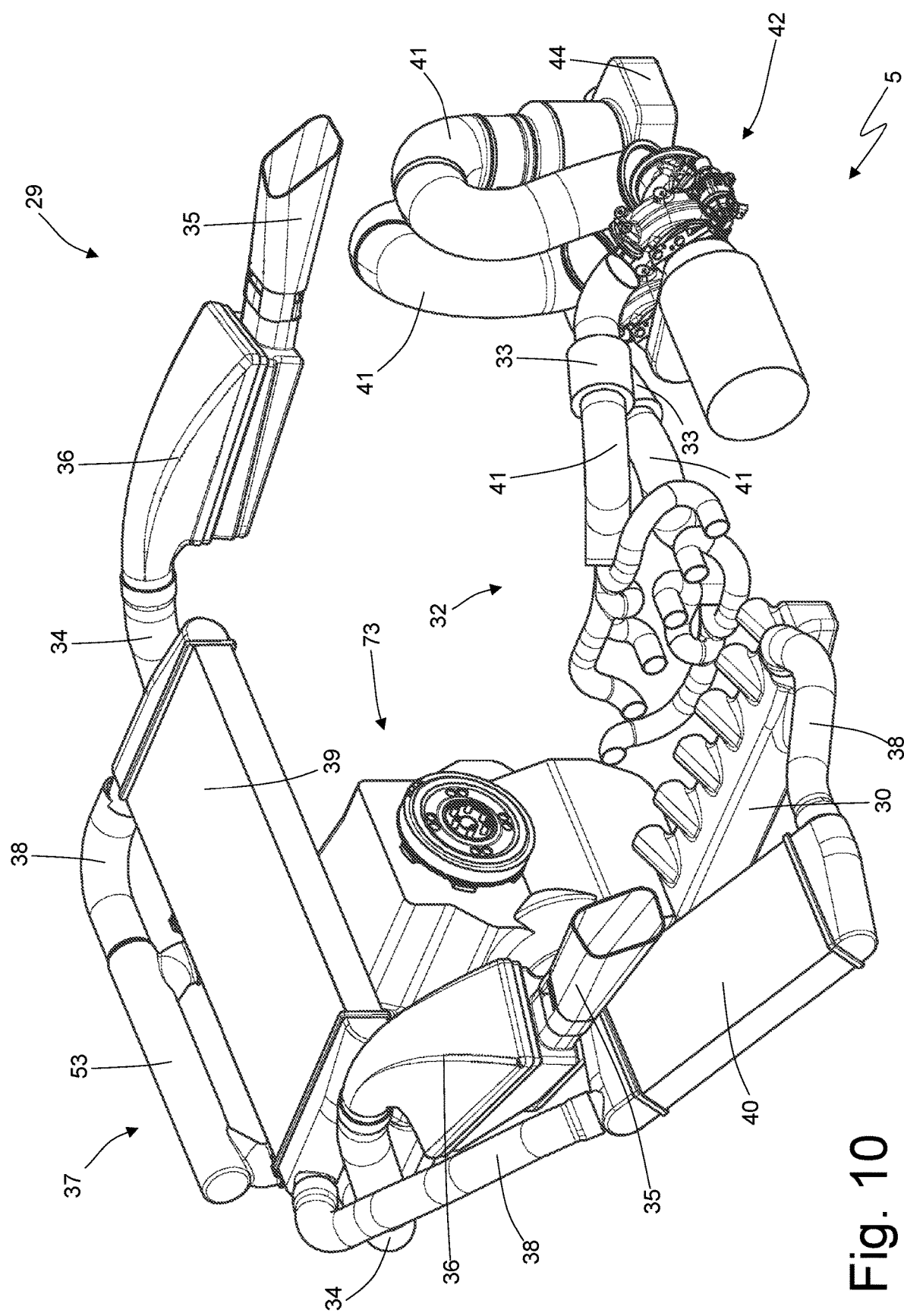

As illustrated in FIGS. 3, 7 and 8, the car 1 comprises a rear aerodynamic diffuser 75 which faces the road surface 14, starts at a rear wall of the cylinder block (consisting of the crankcase 17 and cylinder head 21) of the internal combustion engine 5 and is arranged below the transmission 7 (i.e., below the containing body 73 wherein the transmission 7 is located).

According to a preferred embodiment, the bottom wall 74 of the containing body 73 (within which the transmission 7 is located) has the same inclination as the rear aerodynamic diffuser 75; i.e., the bottom wall 74 of the containing body 73 reproduces the shape of the rear aerodynamic diffuser 75, having the same inclination thereof. Thereby, the rear aerodynamic diffuser 75 exploits all the available space below the transmission 7 (i.e., below the containing body 73 wherein the transmission 7 is located).

Figure 6:
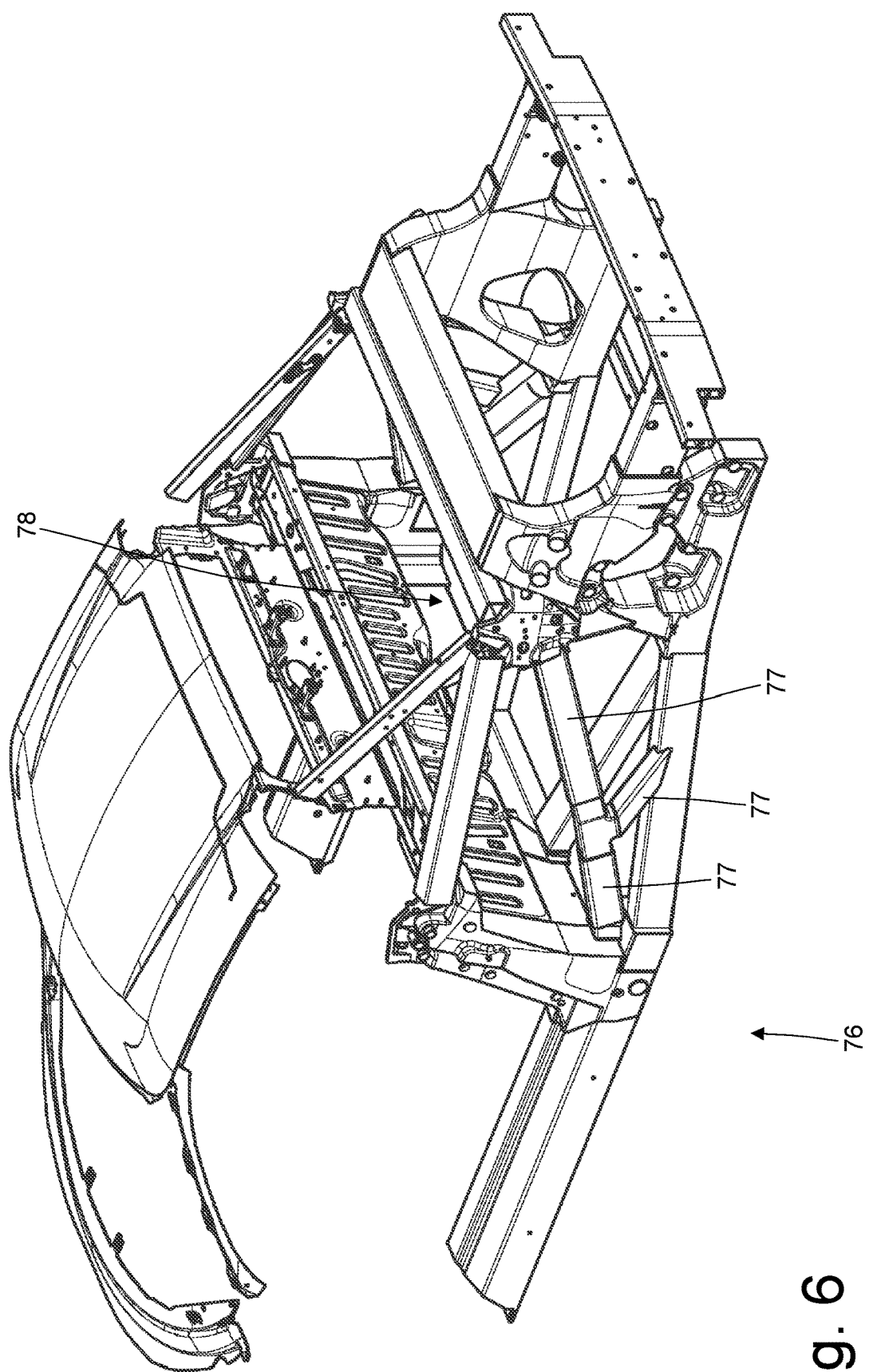
FIG. 6 is a perspective view with parts removed for clarity of a chassis of the car of FIG. 1.

As illustrated in FIG. 6, the car 1 comprises a chassis 76 (partially illustrated in FIG. 6). The rear part of the chassis 76 comprises sidebars 77 which are arranged at the spherical tanks 15 to protect the spherical tanks 15 from lateral impacts; the sidebars 77 form tetrahedrons to have greater impact resistance.

As illustrated in FIG. 6, an engine compartment 78 is obtained inside the chassis 76, wherein the internal combustion engine 5 is arranged. As illustrated in FIG. 3, the bottom 14 of the car 1 comprises an opening 79 which is arranged at the engine compartment 78 and a removable panel 80 which is removably fixed and closes the opening 79. The opening 79 has a dimension similar to the dimension of the engine compartment 78; i.e., the dimension of the opening 79 is approximately (as far as possible) equal to the dimension of the engine compartment 78 so that there can be complete access to the engine compartment 78 through the opening 79.

According to a preferred embodiment, the removable panel 80 is at least partially transparent; in particular, the removable panel 80 has a transparent window 81 (e.g., glass) in the centre. The function of the transparent window 81 is essentially technical in that it allows the internal combustion engine 5 to be visually inspected without having to remove the removable panel 80.

According to a preferred embodiment, the body 12 has no opening bonnet (arranged above the engine compartment 78) allowing access to the engine compartment 78; i.e., access to the engine compartment 78 is only from below through the opening 79, as the upper part of the engine compartment 78 is permanently closed by fixed, non-removable panels of the body 12.

According to a preferred embodiment, the removable panel 80 is directly fixed to the chassis 76 by means of a plurality of screws 82 (preferably quarter-turn screws 82).

The rear aerodynamic diffuser 75 faces the road surface 14, is arranged to the rear of the removable panel 80 and borders the removable panel 80. That is, the rear aerodynamic diffuser 75 starts where the removable panel 80 ends. The aerodynamic diffuser 75 is also detachable to allow easier access to the containing body 73 of the transmission 7.

In the embodiment illustrated in FIGS. 9-12, the turbine unit 42 is provided, which generates electrical energy by means of the electric generator 54 and the compressor unit 37 drives the two compressors 49 by means of the electric motor 50, which utilises (at least in part) the electrical energy generated by the electric generator 54 of the turbine unit 42.

In the embodiment illustrated in FIGS. 18-21, the turbine unit 42 is not provided and the compressor unit 37 lacks the electric motor 50 since the two compressors 49 are driven by the transmission 7, drawing motion from the drum 64 of the clutches 65 of the transmission 7 (as will be further explained below). In other words, the two compressors 49 are driven by the transmission shaft 67 of the transmission 7 (which directly rotates the drum 64 of the clutches 65 and is directly connected to the drive shaft 20). This embodiment is energetically somewhat less efficient (not recovering part of the energy of the exhaust gases through the turbine unit 42) but is lighter, more compact and simpler, eliminating the electrical part altogether (in fact, neither the electric generator 54 of the turbine unit 42 nor the electric motor 50 of the compressor unit 37 are present).

As illustrated in FIGS. 22-26, there is an actuating system 83 which connects the drum 64 of the transmission 7 to the compressor unit 37 (i.e., to the two compressors 49 of the compressor unit 37) so as to receive motion from the drum 64 of the transmission 7 to bring the two compressors 49 of the compressor unit 37 into rotation. By way of example, the actuating system 83 increases the rotation speed so that the two compressors 49 of the compressor unit 37 always rotate faster than the drum 64 of the transmission 7; for example, the two compressors 49 of the compressor unit 37 could rotate 7-8 times faster than the drum 64 of the transmission 7.

As illustrated in FIG. 15, the actuating system 83 is connected to an end wall of the drum 64 of the transmission 7 on the opposite side of the transmission shaft 67; that is, the drum 64 of the transmission 7 has an end wall which is connected to the transmission shaft 67 on one side and is connected to the actuating system 83 on the opposite side.

Figure 24:
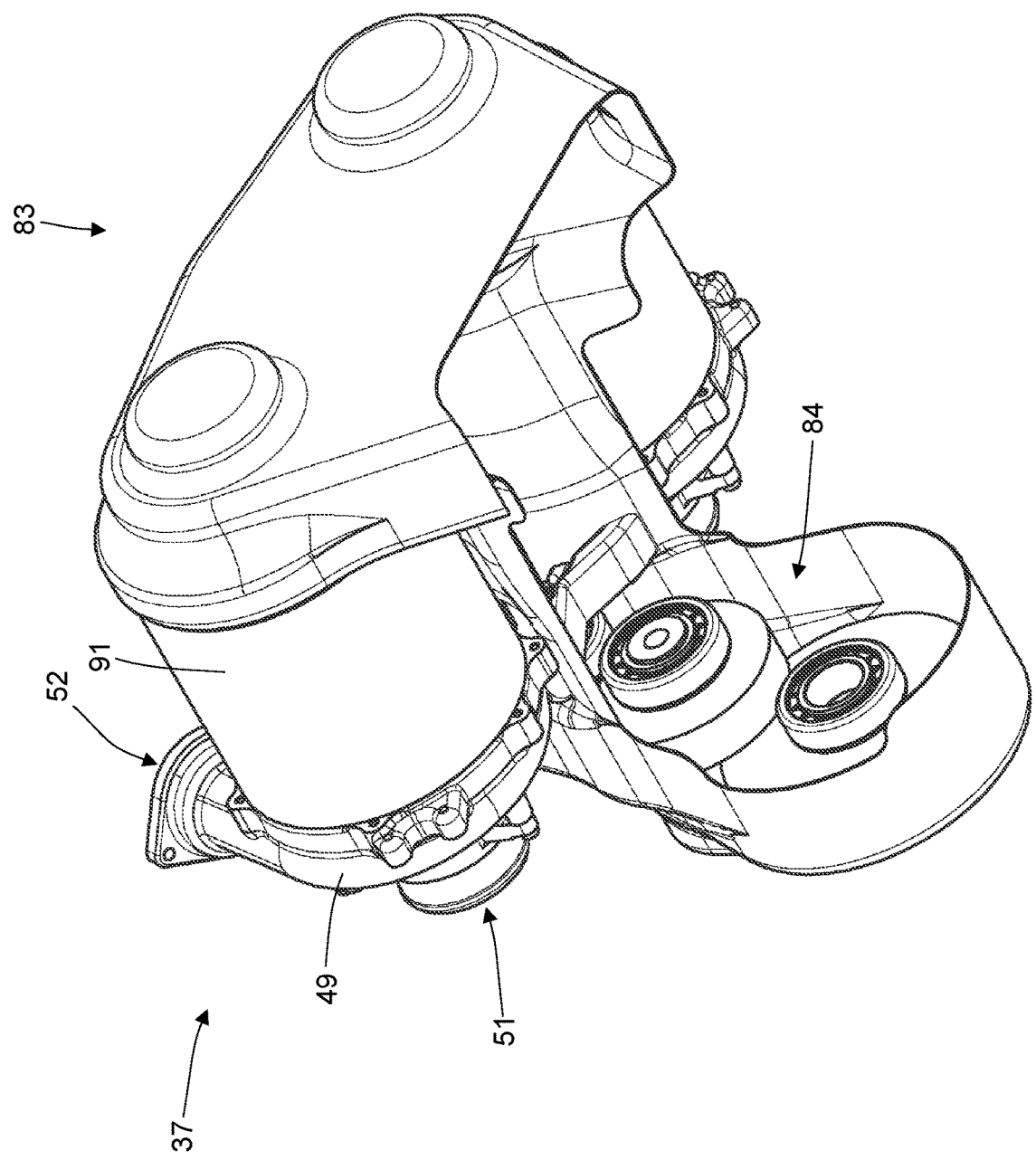
FIGS. 24 and 25 are two different perspective views of the compressor unit of FIGS. 22 and 23 and a corresponding actuating system.

According to a possible embodiment schematically illustrated in FIG. 24, the actuating system 83 comprises a varying device 84 which is interposed between the drum 64 of the transmission 7 and the compressors 49 and has a variable gear ratio. Preferably, the varying device 84 has a centrifugal activation so as to autonomously change the gear ratio as a function of the rotation speed of the drum 64 of the transmission 7; in particular, the varying device 84 is configured to decrease the gear ratio as the rotation speed of the drum 64 of the transmission 7 increases. That is, when the rotation speed of the drum 64 of the transmission 7 is lower, the gear ratio is larger and therefore (for the same rotation speed of the drum 64) the compressors 49 run faster, whereas when the rotation speed of the drum 64 of the transmission 7 is higher, the gear ratio is smaller and therefore (for the same rotation speed of the drum 64) the compressors 49 turn slower; thereby, the compressors 49 are able to generate effective compression even when the drum 64 of the transmission rotates slowly without "over-revving" when the drum 64 of the transmission rotates fast.

According to a preferred embodiment, the varying device 84 has only two different gear ratios; by way of example, the two gear ratios obtainable by means of the varying device 84 could differ from each other by 30-40%.

According to a preferred embodiment, the varying device 84 comprises a direct drive engaged by a centrifugal clutch and a planetary gear which realises a lower gear ratio from the direct drive:the centrifugal clutch is operated by the centrifugal force which compresses the clutch discs by engaging the direct drive when the rotation speed of the drum 64 of transmission 7 exceeds a threshold value (thus resulting in a reduction of the gear ratio when the rotation speed of the drum 64 of the transmission 7 exceeds the threshold value). According to a preferred embodiment, a gear ratio of the varying device 84 could correspond to a direct drive (i.e., a 1:1 gear ratio) while the other gear ratio could be comprised between 1:1.3 and 1:1.4.

According to a preferred embodiment, the varying device 84 is connected to the drum 64 of the transmission 7 on the opposite side of the primary shafts 66 and the transmission shaft 67.

In the embodiment illustrated in FIGS. 22-26, the two compressors 49 are arranged parallel to each other and spaced apart so as to rotate about two rotation axes 85 which are parallel to each other and spaced apart and are parallel to a rotation axis 86 of the drum 64 of the transmission 7 (which is coaxial to the primary shafts 66, the transmission shaft 67, and the drive shaft 20). In particular, the rotation axis 86 of the drum 64 of the transmission 7 is arranged between the rotation axes 85 of the two compressors 49; i.e., the two compressors 49 are arranged on opposite sides of the rotation axis 86 of the drum 64 of the transmission 7.

Figure 26:
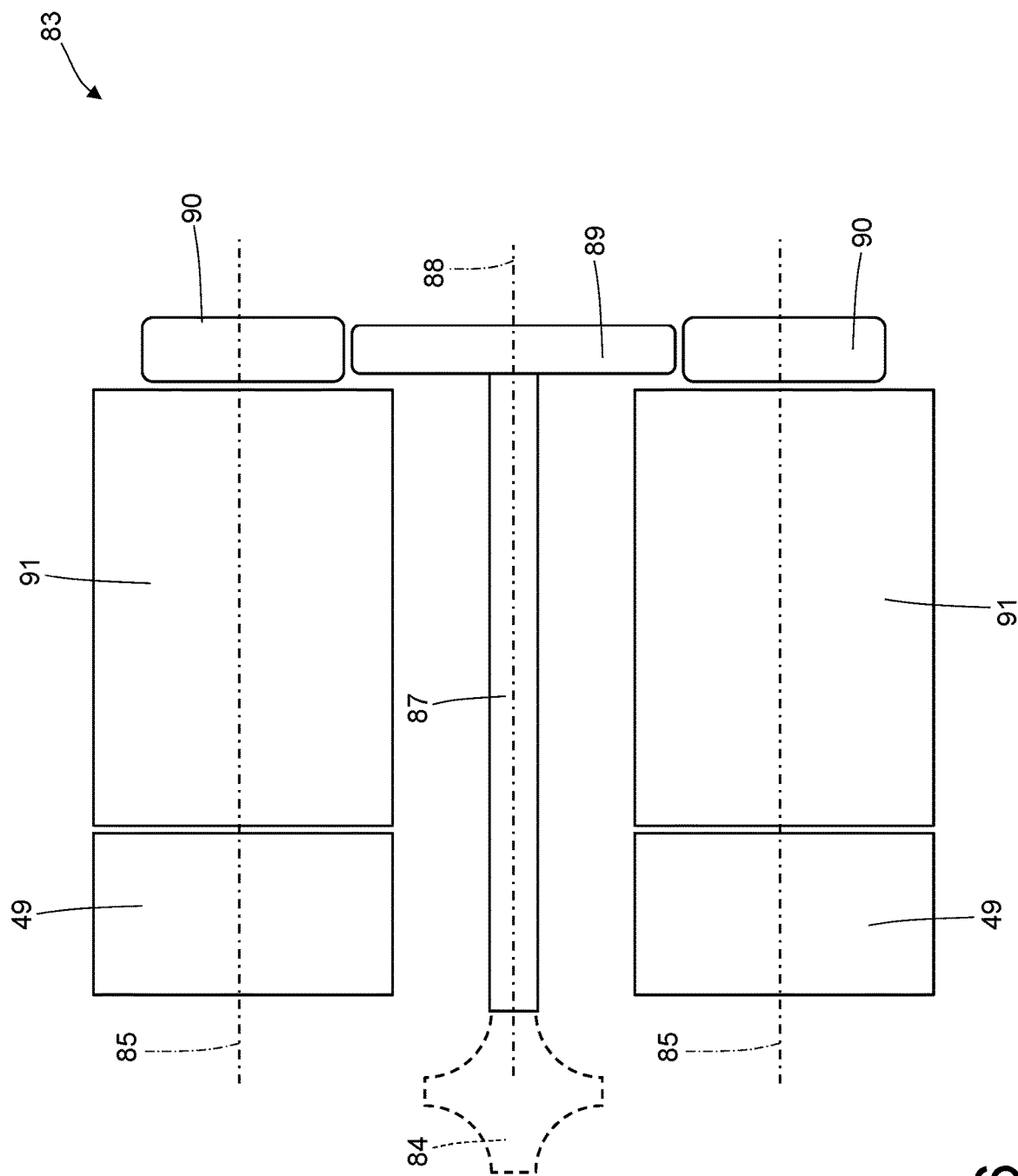
FIG. 26 is a schematic view of part of the actuating system of FIGS. 24 and 25.

According to a preferred embodiment illustrated in FIG. 26, the actuating system 83 comprises an intermediate shaft 87 which receives motion from the drum 64 of the transmission 7 and rotates about a rotation axis 88 which is parallel to and spaced from the rotation axis 86 of the drum 64 of the transmission 7. In particular, the varying device 84 is between the drum 64 of the transmission 7 and the intermediate shaft 87. The actuating system 83 comprises a central toothed gear 89 which receives motion from the intermediate shaft 87 (i.e., is constrained to the intermediate shaft 87) and two side toothed gears 90 which are arranged on either side of the central toothed gear 89, engage with the central toothed gear 89 and each transmit motion to a corresponding compressor 49 (i.e., each side toothed gear 90 is constrained to a shaft of a corresponding compressor 49).

A transmission 91 is interposed between each side toothed gear 90 and the corresponding compressor 49, which increases the rotation speed so that the compressor 49 can rotate faster than the side toothed gear 90.

Overall, the compressors 49 rotate much faster than the drive shaft 20 (i.e., the drum 64 of the transmission 7): the compressors 49 rotate about ten times faster than the drive shaft 20 (i.e., the compressors 49 can reach 100,000 rpm while the drive shaft 20 can reach 10,000 rpm).

Figure 22:
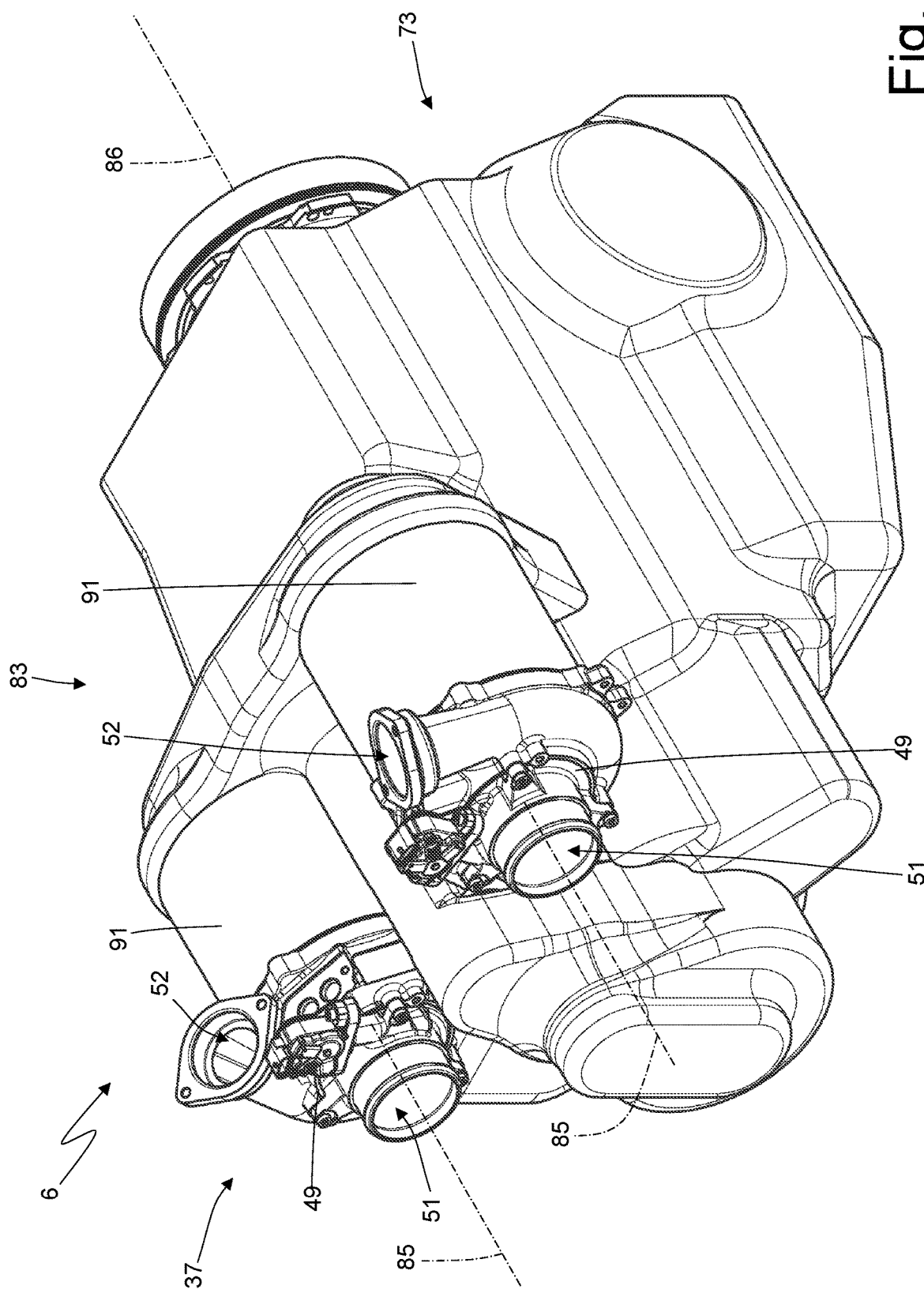
FIGS. 22 and 23 are respectively a perspective view and a rear view of a transmission system and a compressor unit coupled to the internal combustion engine of FIGS. 18-21.
Figure 23:
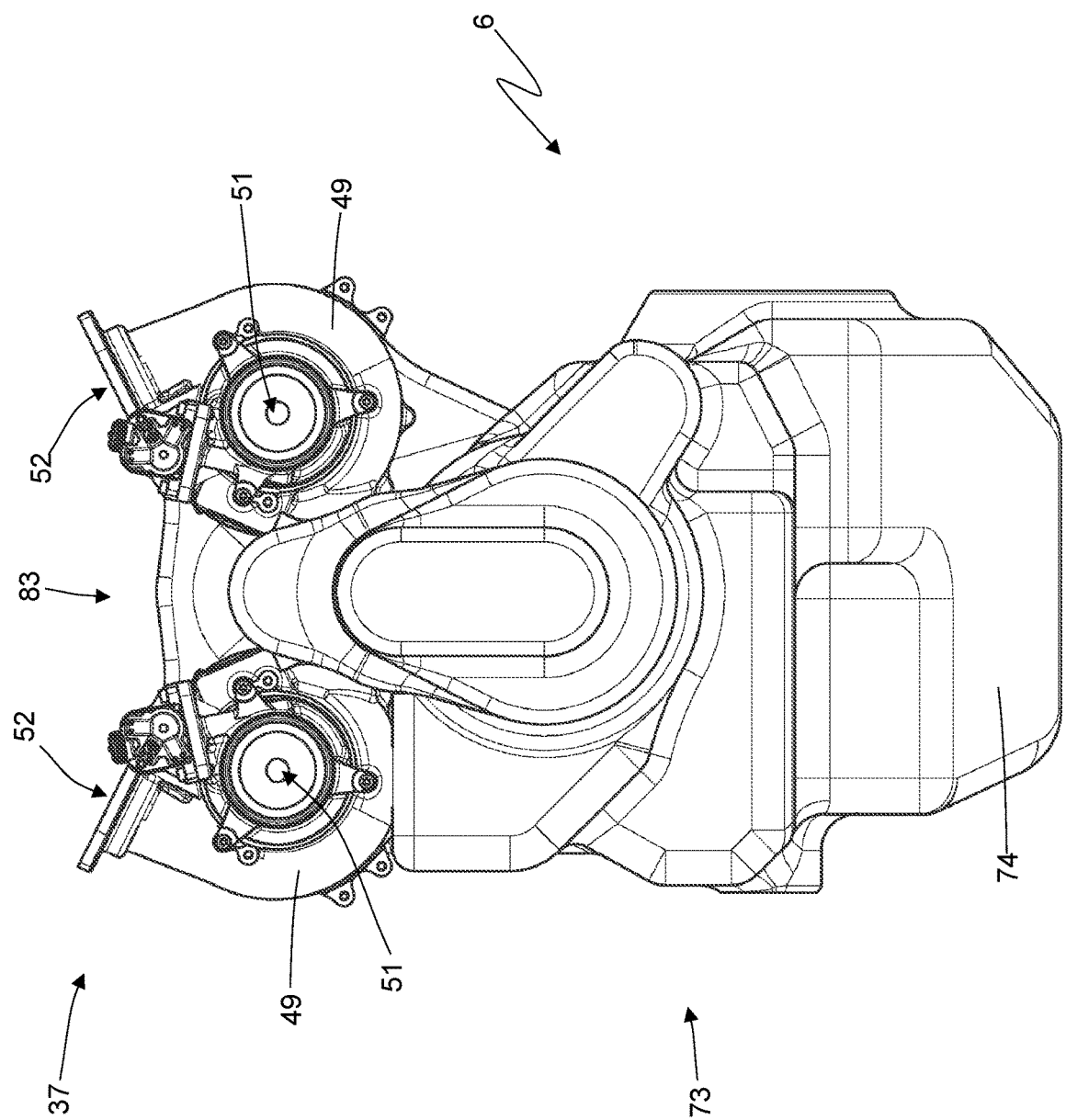
Figure 25:
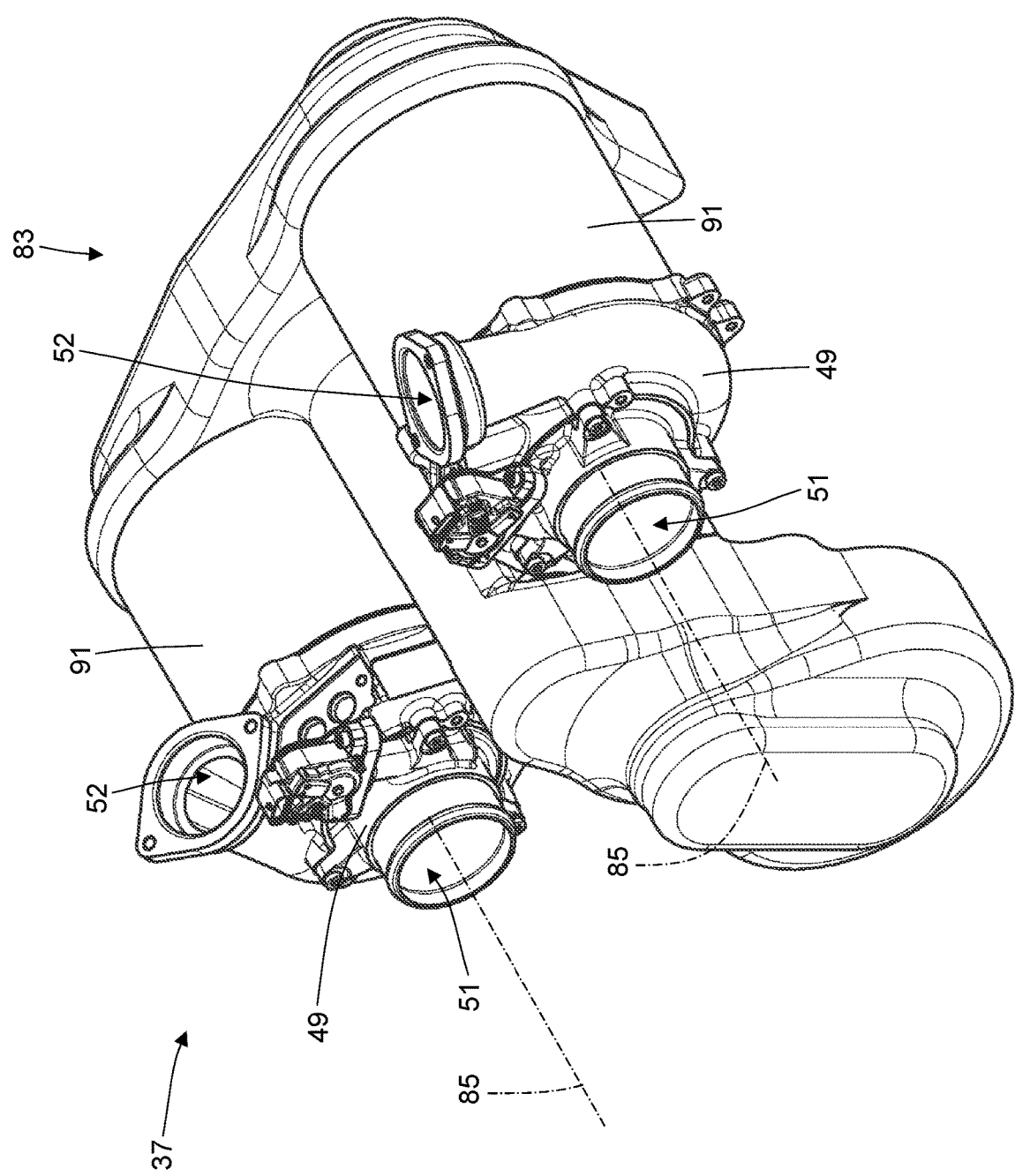

As illustrated in FIGS. 22 and 25, each compressor 49 comprises an axial inlet 51 arranged on the opposite side of the actuating system 83 and a radial outlet 52. As described above, there is a joining duct 53 (not illustrated in FIGS. 22-25) which is connected to both outlets 52 of the two compressors 49 to receive and join the compressed air from both compressors 49.

In the embodiment illustrated in FIGS. 9-12, there are two exhaust ducts 41 which originate from the cylinders 18 and terminate in the silencer 44 and are completely separate and independent from the cylinders 18 to the silencer 44. Instead, in the embodiment illustrated in FIGS. 18-21, an exhaust duct 92 is provided, into which both exhaust ducts 41 flow and which terminates in the silencer 44; i.e., the exhaust ducts 41 join together upstream of the silencer 44, flowing together in the exhaust duct 92, which terminates in the silencer 44. In other words, the exhaust system 32 comprises a single exhaust duct 92 which receives exhaust gases from both exhaust ducts 41; i.e., the two exhaust ducts 41 join to converge towards the single exhaust duct 92. The exhaust duct 92 starts at the junction of the two exhaust ducts 41 and terminates in the silencer 44.

In the embodiment illustrated in the accompanying drawings, the compressor unit 37 comprises two twin compressors 49; according to a different embodiment not illustrated, the compressor unit 37 comprises a single compressor 49.

In the embodiment illustrated in the accompanying drawings, the turbine unit 42 (when present) comprises two twin turbines 43; in a different embodiment not illustrated, the turbine unit 42 (when present) comprises a single turbine 43.

The herein described embodiments can combine one another without departing from the scope of protection of the present invention.

The car 1 as described above has many advantages.

Firstly, the car 1 described above allows to simultaneously combines a large hydrogen storage capacity (thus being able to offer a satisfactory range) with very high dynamic performance thanks to an optimal wheelbase, overall weight, and weight distribution. These results are achieved thanks to the particular shape and arrangement of the internal combustion engine 5 and the transmission system 6, which allow to create a large amount of free space to house the hydrogen tanks 9 and 10 without penalising the dynamic performance of the car 1.

The car 1 as described above allows the construction of an extremely large rear aerodynamic chute (diffuser), thus enabling the generation of a very high aerodynamic load without any penalisation of aerodynamic drag.

In the car 1 described above, it is possible to hear inside the passenger compartment 15 (particularly in the driver's station 16 where the driver sits) an exhaust noise with a sufficiently high intensity and a very good sound quality; this result is obtained thanks to the fact that the outlet opening is located very close to the passenger compartment 15 and on the side of the driver's station 16, as this solution allows to both "concentrate" the sound intensity near the passenger compartment 15 and to have a very natural exhaust noise (i.e., not artificially created or in any case modified). That is, the exhaust noise is not artificially "aimed" towards the passenger compartment 15 through non-natural transmission channels but, on the contrary, the exhaust noise only reaches the passenger compartment 15 by passing through the exhaust system, i.e., by following the natural exit route of the exhaust noise.

In the car 1 described above, thanks in part to the particular conformation of the dual-clutch transmission 7 wherein the drum 64 is arranged on the opposite side of the internal combustion engine, it is possible to achieve a particularly favourable (i.e., compact while being very functional) positioning of all the powertrain elements in order to minimise the length of the wheelbase (i.e., the distance between the front and rear axles).

In the car 1 described above, thanks in part to the particular conformation of the compressor unit 37 wherein the twin compressors 49 are arranged coaxially on opposite sides of the electric motor 50, it is possible to obtain a particularly favourable arrangement of all the elements of the powertrain system (i.e., compact while being very functional); at the same time, the presence of twin compressors 49 allows particularly high air flow rates to be compressed.

In the car 1 described above, also thanks to the particular conformation of the turbine unit 42 wherein the two twin turbines 42 are arranged side by side to operate a common electric generator 54, it is possible to obtain a particularly favourable arrangement of all the elements of the powertrain system (i.e., compact while being very functional); at the same time the presence of two twin turbines 42 allows a high amount of energy to be recovered from the exhaust gas.

In the car 1 described above (in particular in the embodiment illustrated in FIGS. 18-26), the geometry of the intake ducts 34 and 38 is optimal in terms of both overall dimensions and pressure drop without having to resort to an electric actuation of the compressor unit 37; this result is obtained by drawing the motion necessary to bring the two compressors 49 of the compressor unit 37 into rotation directly from the drum 64 of the dual-clutch transmission 7, which is in a very favourable position for the positioning of the compressor unit 37.

In the car 1 described above, the particular conformation and positioning of the two intercoolers 39 and 40 allow to maximise the cooling effectiveness and efficiency of the compressed air without requiring overly severe constraints on the placement of all the other components of the internal combustion engine 5.

In the car 1 as described above, the aerodynamic diffuser 75 is very large (thus allowing a high aerodynamic load to be generated with a modest increase in drag) even if the internal combustion engine 5 is located in a central/rear position (thus having an optimal distribution of masses between the front and rear axle) and, at the same time, the wheelbase is relatively short (i.e., the car 1 exhibits extremely high-performance dynamic behaviour). This result is obtained by placing the internal combustion engine 5 with the drive shaft 20 arranged higher: thereby, also the transmission 7 can be arranged higher, thus freeing up the necessary space in the lower part of the rear of the car to house the aerodynamic diffuser 75 having a very large size.

In the car 1 described above, accessibility to all areas of the internal combustion engine 5 is excellent and complete; this is obtained thanks to the accessibility from below which, once the car 1 has been lifted, always allows a worker to position himself exactly below the component to be worked on. That is, the accessibility to the internal combustion engine 5 from below makes maintenance easy and simple, since the workers are not restricted by the shape of the car 1, but can easily move in all the areas of the internal combustion engine 5, as the car 1 is lifted.

In the car 1 described above, the fact that the removable panel is at least partially transparent constitutes not only an undoubted technical advantage as explained above, but also an aesthetic innovation and makes the removable panel also an aesthetic element; it is important to note that thanks to the large aerodynamic diffuser 75, it is relatively easy to see at least part of the internal combustion engine 5 through the transparent part of the removable panel without having to bend down excessively.

In the car 1 described above, the body 12 is particularly rigid and strong thanks to the complete absence of an opening for access to the engine compartment 78 (and normally closed by a bonnet). Thereby, with the same rigidity, the overall mass of the body 12 can be reduced. Furthermore, the absence of an opening for access to the engine compartment 78 also makes the body 12 completely continuous (i.e., without interruptions), thus reducing the aerodynamic penetration coefficient. The possibility of eliminating an opening for access to the engine compartment 78 through the body 12 is given by the fact that the internal combustion engine 5 does not require any maintenance in the upper part (consisting of the crankcase 17) and consequently it is no longer necessary to access the engine compartment 78 from above. In fact, all the main components of the internal combustion engine 5 are located in the lower part of the engine compartment 78 and are easily accessible from the bottom 14 through the opening 79 closed by the removable panel 80.

In the car 1 described above, the lubrication pumps 60 and 61 and the cooling pump 63 are optimally placed to minimise the number of components required to bring the pumps 60, 61 and 63 in rotation and, at the same time, keep the pressure drops in the lubrication circuit 59 and the cooling circuit 62 low. That is, the simultaneous grouping and actuation by means of the two camshafts 23 and 26 of the four pumps 60, 61 and 63 makes the solution cheaper, lighter and more compact relative to the known solutions currently on the market.

LIST OF REFERENCE NUMBERS OF THE FIGURES 1 car
2 front wheels
3 electric machine
4 rear wheels
5 internal combustion engine
6 transmission system
7 transmission
8 rear differential
9 passenger compartment
10 driving station
11 steering wheel
12 body
13 doors
14 bottom
15 tank
16 tank
17 crankcase
18 cylinders
19 pistons
20 drive shaft
21 cylinder head
22 intake valves
23 camshaft 24 belt drive
25 exhaust valves
26 camshaft
27 fuel injector
28 spark plug
29 intake system
30 intake manifold
31 throttle valve
32 exhaust system
33 treatment device
34 intake ducts
35 air inlet
36 air filter
37 compressor unit
38 intake duct
39 intercooler
40 intercooler
41 exhaust ducts
42 turbine unit
43 turbines
44 silencer
45 end pipe
46 outlet opening
47 shaft
48 rotation axis
49 compressor
50 electric motor
51 axial inlet
52 radial outlet
53 joining duct
54 electric generator
55 rotation axes
56 transmission device
57 radial inlet
58 axial outlet
59 lubrication circuit
60 lubrication pump
61 lubrication pump
62 cooling circuit
63 cooling pump
64 drum
65 clutches
66 primary shafts
67 transmission shaft
68 secondary shaft
69 axle shafts
70 primary toothed gear
71 secondary toothed gear
72 synchronisers
73 containing body
74 bottom wall
75 aerodynamic diffuser
76 chassis
77 sidebars
78 engine compartment
79 opening
80 removable panel
81 transparent window
82 screws
83 actuating system
84 varying device
85 rotation axes
86 rotation axis
87 intermediate shaft
88 rotation axis
89 central toothed gear
90 side toothed gear
91 transmission
92 exhaust duct

The invention claimed is:

1. A car (1) comprising:
two front wheels (2);
two rear drive wheels (4);
a passenger compartment (15) arranged between the two front wheels (2) and the two rear wheels (4);
a body (12) delimiting the passenger compartment (15) and having two sidewalls in which at least two doors (13) are obtained;
a bottom (14), which is the lowest part of the car (1) and, in use, faces a road surface on which the car (1) moves;
an internal combustion engine (5) provided with a plurality of cylinders (18), within which respective pistons (19) slide, and with a drive shaft (20) connected to the pistons (19); and
at least one exhaust duct (41) which originates from the cylinders (18) and ends with a silencer (44) provided with at least one outlet opening (46) which is arranged in an asymmetrical manner at one single side of the car (1) and is located between a rear wheel (4) and a door (13);
wherein the internal combustion engine (5) is longitudinally arranged in a central or rear position behind the passenger compartment (15); and
wherein in the internal combustion engine (5), the cylinders (18) are arranged in a line.

2. The car (1) according to claim 1, wherein the outlet opening (46) of the silencer (44) is arranged on the side wherein the driver's station (16) is located.

3. The car (1) according to claim 1, wherein the outlet opening (46) of the silencer (44) is obtained through a sidewall of the body (12).

4. The car (1) according to claim 1, wherein the outlet opening (46) of the silencer (44) is obtained through the bottom (14).

5. The car (1) according to claim 1, wherein the silencer (44) comprises one single outlet opening (46).

6. The car (1) according to claim 1, wherein the silencer (44) is arranged on a side of the car (1) beside a cylinder block of the internal combustion engine (5) and in front of a rear drive wheel (4).

7. The car (1) according to claim 1, wherein the internal combustion engine (5) comprises two exhaust ducts (41), which are independent of and separate from one another, which originate from the cylinders (18) and end in the single common silencer (44).

8. The car (1) according to claim 1, wherein the internal combustion engine (5) comprises:
two first exhaust ducts (41), which are independent of and separate from one another and originate from the cylinders (18); and
a second exhaust duct (92), wherein the two first exhaust ducts (41) merge and which ends in the single common silencer (44).

9. The car (1) according to claim 8 and comprising two exhaust gas treatment devices (33), each of which is arranged along a respective first exhaust duct (41).

10. The car (1) according to claim 1 and comprising a single silencer (44) which is provided with the outlet opening (46).

11. The car (1) according to claim 10, wherein the single silencer (44) is arranged asymmetrically alongside a cylinder block of the internal combustion engine (5).

12. The car (1) according to claim 11, wherein the single silencer (44) is arranged between the cylinder block of the internal combustion engine (5) and a sidewall of the car (1).

\* \* \* \* \*